US012659696B2

(12) United States Patent     (10) Patent No.:   US 12,659,696 B2
Wang et al.     (45) Date of Patent:    Jun. 16, 2026

(54) COMMUNICATION METHOD, APPARATUS, AND SYSTEM ON PACKET DATA CONVERGENCE PROTOCOL (PDCP)

(71) Applicant: HUAWEI TECHNOLOGIES CO., LTD., Shenzhen (CN)

(72) Inventors: Hong Wang, Beijing (CN); Bingzhao Li, Beijing (CN); Bin Xu, Beijing (CN); Lei Chen, Beijing (CN); Xuelong Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 414 days.

(21) Appl. No.: 17/724,999

(22) Filed: Apr. 20, 2022

(65) Prior Publication Data

US 2022/0248192 A1     Aug. 4, 2022

Related U.S. Application Data

(63) Continuation of application No. PCT/CN2020/121596, filed on Oct. 16, 2020.

(30) Foreign Application Priority Data

Oct. 21, 2019    (CN) .......................... 201911001897.9

(51) Int. Cl.
   *H04W 4/06*      (2009.01)
   *H04L 65/611*     (2022.01)
   *H04W 4/18*      (2009.01)
(52) U.S. Cl.
   CPC ............. *H04W 4/06* (2013.01); *H04L 65/611* (2022.05); *H04W 4/18* (2013.01)
(58) Field of Classification Search
   CPC ................................. H04W 8/18; H04W 4/06
            (Continued)

(56) References Cited

U.S. PATENT DOCUMENTS

2012/0147875 A1 * 6/2012 Watanabe ............... H04L 45/04
                                   370/338
2016/0113058 A1 * 4/2016 Jung ..................... H04W 76/27
                                   370/328
(Continued)

FOREIGN PATENT DOCUMENTS

AU      2012201114 A1 * 3/2012 .............. H04W 4/06
CN       101931881 A * 12/2010 .............. H04W 4/06
                     (Continued)

OTHER PUBLICATIONS

Zhao, Chao (WO 2014/082270 A1) Method, Apparatus and System for Controlling Data Transmission Jun. 5, 2014.*

(Continued)

*Primary Examiner* — Rafael Pérez-Gutiérrez
(74) *Attorney, Agent, or Firm* — WOMBLE BOND DICKINSON (US) LLP

(57)           ABSTRACT

This application provides a communication method, apparatus, and system. The communication method includes: a centralized unit receives a data packet sent in a multicast manner. The centralized unit generates a packet data convergence protocol (PDCP) data unit based on the data packet, where the PDCP data unit includes the data packet and a PDCP header. The centralized unit sends the PDCP data unit to a distributed unit. The distributed unit receives the PDCP data unit from the centralized unit, where the PDCP data unit includes the PDCP header, a synchronization protocol header, and a payload. The distributed unit generates a media access control (MAC) data unit, where the MAC data unit includes a MAC header, an RLC header, the PDCP header, and the payload.

14 Claims, 20 Drawing Sheets

(58) Field of Classification Search
USPC ........ 370/312, 329, 328, 338, 341, 345, 350
See application file for complete search history.

(56) References Cited

U.S. PATENT DOCUMENTS

| | | | | |
|---|---|---|---|---|
| 2018/0206213 A1* | 7/2018 | Kim | ......................... | H04L 69/22 |
| 2019/0260464 A1* | 8/2019 | Roy | ................... | H04B 7/18563 |
| 2020/0389263 A1 | 12/2020 | Toeda et al. | | |

FOREIGN PATENT DOCUMENTS

| | | |
|---|---|---|
| CN | 108696900 A | 10/2018 |
| CN | 109413692 A | 3/2019 |
| CN | 109429183 A | 3/2019 |
| CN | 110278058 A | 9/2019 |
| WO | 2019097705 A1 | 5/2019 |

OTHER PUBLICATIONS

NEC, Solving some FFS in 38.401. 3GPP TSG-RAN3#97, Berlin, Germany, Aug. 21-25, 2017, R3-173026, 8 pages.

3GPP, "3GPP TS 38.401 V15.6.0", 3rd Generation Partnership Project Technical Specification Group Radio Access Network NG-RAN Architecture description (Release 15), Jul. 13, 2019, total 46 pages.

3GPP TS 36.322 V15.3.0:"3rd Generation Partnership Project; Technical Specification Group Radio Access Network; Evolved Universal Terrestrial Radio Access (E-UTRA); Radio Link Control (RLC) protocol specification(Release 15)",2019-09, total 47 pages.

3GPP TS 38.300 V15.7.0 (Sep. 2019), 3rd Generation Partnership Project; Technical Specification Group Radio Access Network; NR; NR and NG-RAN Overall Description; Stage 2(Release 15), 99 pages.

3GPP TS 38.321 V15.7.0:"3rd Generation Partnership Project; Technical Specification Group Radio Access Network; NR; Medium Access Control (MAC) protocol specification (Release 15)",Sep. 2019, total 78 pages.

3GPP TS 38.322 V15.5.0 3rd Generation Partnership Project; Technical Specification Group Radio Access Network; NR; Radio Link Control (RLC) protocol specification (Release 15) Mar. 2019, total 33 pages.

3GPP TS 38.323 V15.6.0 (Jun. 2019), 3rd Generation Partnership Project; Technical Specification Group Radio Access Network; NR; Packet Data Convergence Protocol (PDCP) specification (Release 15), 26 pages.

SA WG2 Meeting #133, S2-1906720, New SID: Architectural enhancements for 5G multicast-broadcast services, SA WG2,Reno, NV, USA, May 13-17, 2019, total 4 pages.

* cited by examiner

100

102    106    104

CONT.
FROM
FIG. 4A

Distributed unit DU

| Packet data convergence protocol PDCP | Synchronization protocol SYNC | Payload |
|---|---|---|

Received PDCP data unit

| Media access control MAC | Radio link control protocol RLC | Packet data convergence protocol PDCP | Synchronization protocol SYNC | Payload |
|---|---|---|---|---|

Process the PDCP data unit

| Media access control MAC | Radio link control protocol RLC | Packet data convergence protocol PDCP | Payload |
|---|---|---|---|

Generated MAC data unit

Terminal UE

| Media access control MAC | Radio link control protocol RLC | Packet data convergence protocol PDCP | Payload |
|---|---|---|---|

CONT.
FROM
FIG. 6A

Distributed unit DU

| Packet data convergence protocol PDCP |
| Payload |
| Synchronization protocol SYNC |

Received PDCP data unit

| Media access control MAC |
| Radio link control protocol RLC |
| Packet data convergence protocol PDCP |
| Payload |
| Synchronization protocol SYNC | ✕ |

Process the PDCP data unit

| Media access control MAC |
| Radio link control protocol RLC |
| Packet data convergence protocol PDCP |
| Payload |

Generated MAC data unit

Terminal UE

| Media access control MAC |
| Radio link control protocol RLC |
| Packet data convergence protocol PDCP |
| Payload |

FIG. 6B

CONT.
FROM

CONT. FROM FIG. 8A

COMMUNICATION METHOD, APPARATUS, AND SYSTEM ON PACKET DATA CONVERGENCE PROTOCOL (PDCP)

CROSS-REFERENCE TO RELATED APPLICATIONS

This application is a continuation of International Application No. PCT/CN2020/121596, filed on Oct. 16, 2020, which claims priority to Chinese Patent Application No. 201911001897.9, filed on Oct. 21, 2019. The disclosures of the aforementioned applications are hereby incorporated by reference in their entireties.

TECHNICAL FIELD

This application relates to the wireless communication field, and more specifically, to a communication method, apparatus, and system.

BACKGROUND

A multimedia broadcast multicast service (MBMS) is a service oriented to a plurality of user equipments (UEs), for example, live streaming and scheduled program playback.

To support sending of the MBMS in a broadcast form, a current long term evolution (LTE) system supports a multicast/multicast single frequency network (MBSFN) transmission method. In the method, a multicast/broadcast service center (BM-SC) sends an MBMS data packet to UE via an MBMS gateway and an eNB. When the BM-SC sends an MBMS data packet to each eNB, a time stamp is added to each data packet, where the time stamp may indicate a time point at which the eNB sends the data packet, so that different eNBs can send the same MBMS data packet at the same time point.

However, in a centralized unit-distributed unit (CU-DU) architecture of a new radio (NR) system, there is no related solution for how to process and send an MBMS data packet.

SUMMARY

This application provides a communication method, apparatus, and system. A centralized unit and a distributed unit process a data packet sent in a multicast manner, to support sending of a multimedia broadcast service in a broadcast form.

It should be understood that, in embodiments of this application, a sequence of a payload, a synchronization protocol header, a packet data convergence protocol (PDCP) header, a media access control (MAC) header, and a radio link control protocol (RLC) header is a defined logical data structure, and is a higher-layer data structure. A sequence at a lower layer and when a data unit (PDU) is processed is not specifically limited in embodiments of this application.

According to a first aspect, this application provides a communication method. The method includes:

A centralized unit receives a data packet sent in a multicast manner.

The centralized unit generates a PDCP data unit based on the data packet, where the PDCP data unit includes the data packet and a PDCP header.

The centralized unit sends the PDCP data unit to a distributed unit.

Based on the foregoing solution, in a centralized unit-distributed unit (CU-DU) architecture, the data packet sent in the multicast manner can be processed, to support sending of a multimedia broadcast service in a broadcast form, and improve processing performance of the multimedia broadcast service.

In a an embodiment, the centralized unit sends PDCP format information of the PDCP data unit to the distributed unit.

The PDCP format information includes at least one of the following:

a length of the PDCP header, a PDCP serial number (SN) length, or a PDCP format indication.

Based on the foregoing solution, the centralized unit sends the PDCP format information to the distributed unit, so that the distributed unit can accurately determine the length of the PDCP header, and further accurately determine a position of a synchronization protocol header, to read and remove the synchronization protocol header.

In a an embodiment, the data packet includes the synchronization protocol header and a payload. In the data packet, the payload is located after the synchronization protocol header. In the PDCP data unit, the PDCP header is located before the synchronization protocol header.

Based on the foregoing solution, the centralized unit may directly add the PDCP header before the synchronization protocol header, to reduce processing at a PDCP layer in the centralized unit.

In a an embodiment, the data packet includes a synchronization protocol header and a payload. In the data packet, the payload is located after the synchronization protocol header. In the PDCP data unit, the payload is located after the PDCP header, and the synchronization protocol header is located after the payload.

Based on the foregoing solution, the centralized unit moves the synchronization protocol header to after the payload, and adds the PDCP header before the payload, so that the centralized unit does not need to send PDCP format information to the distributed unit, to reduce signaling interworking between the centralized unit and the distributed unit.

In a an embodiment, the data packet includes a synchronization protocol header and a payload. In the data packet, the payload is located after the synchronization protocol header. In the PDCP data unit, the PDCP header is located after the synchronization protocol header, and the payload is located after the PDCP header.

Based on the foregoing solution, the centralized unit adds the PDCP header before the payload, and moves the synchronization protocol header to before the PDCP header, so that the centralized unit does not need to send PDCP format information to the distributed unit, to reduce signaling interworking between the centralized unit and the distributed unit.

In an embodiment, the data packet includes a first synchronization packet data unit, and the first synchronization packet data unit includes a synchronization protocol header and a payload. In the first synchronization packet data unit, the payload is located after the synchronization protocol header. In the PDCP data unit, the PDCP header is located before a second synchronization packet data unit. The second synchronization packet data unit is obtained by reversing a bit stream of the first synchronization packet data unit.

Based on the foregoing solution, the centralized unit reverses the bit stream of the first synchronization packet data unit in the data packet to obtain the second synchronization packet data unit, and adds the PDCP header before the second synchronization packet data unit, so that the centralized unit does not need to send PDCP format information to the distributed unit, to reduce signaling interworking between the centralized unit and the distributed unit.

In a an embodiment, the data packet includes a payload and a synchronization protocol header. In the data packet, the synchronization protocol header is located after the payload. In the PDCP data unit, the PDCP header is located before the payload.

Based on the foregoing solution, the synchronization protocol header in the data packet received by the centralized unit is after the payload, and the centralized unit may directly add the PDCP header before the payload, so that processing at a PDCP layer in the centralized unit is reduced, and the centralized unit does not need to send PDCP format information to the distributed unit, to reduce signaling interworking between the centralized unit and the distributed unit.

In a an embodiment, a value of an octet counter included in the data packet is a first value, a value of an octet counter of the PDCP data unit is a second value, and the second value is equal to a sum of the first value and a quantity of octets of the PDCP header.

In another an embodiment, a value of an octet counter included in the data packet is a first value, the centralized unit sets a value of an octet counter to a second value, and the second value is equal to a sum of the first value and a quantity of octets of the PDCP header.

Based on the foregoing solution, the second value of the octet counter of the PDCP data unit is a sum of the first value of the octet counter included in the data packet and the quantity of octets of the PDCP header, so that the distributed unit can determine, based on a sum of the quantity of octets of the PDCP header and a quantity of octets of the payload in the PDCP data unit, whether data is lost.

In a an embodiment, a value of an octet counter included in the data packet is a first value, a value of an octet counter of the PDCP data unit is a second value, and the second value is equal to a sum of the first value and a quantity of octets of the synchronization protocol header.

In another an embodiment, a value of an octet counter included in the data packet is a first value, the centralized unit sets a value of an octet counter to a second value, and the second value is equal to a sum of the first value and a quantity of octets of the synchronization protocol header.

Based on the foregoing solution, the second value of the octet counter of the PDCP data unit is a sum of the first value of the octet counter included in the data packet and the quantity of octets of the synchronization protocol header, so that the distributed unit can determine, based on a sum of the quantity of octets of the synchronization protocol header and a quantity of octets of the payload in the PDCP data unit, whether data is lost.

In a an embodiment, the data packet includes a first octet counter, the PDCP data unit includes a second octet counter, and a value of the second octet counter is a sum of a value of the first octet counter and a quantity of octets of the PDCP header.

Based on the foregoing solution, the value of the second octet counter of the PDCP data unit is a sum of the value of the first octet counter included in the data packet and the quantity of octets of the PDCP header, so that the distributed unit can determine, based on a sum of the quantity of octets of the PDCP header and a quantity of octets of the payload in the PDCP data unit, whether data is lost.

In a an embodiment, the data packet includes a first octet counter, the PDCP data unit includes a second octet counter, and a value of the second octet counter is a sum of a value of the first octet counter and a quantity of octets of the synchronization protocol header.

Based on the foregoing solution, the value of the second octet counter of the PDCP data unit is a sum of the first value of the first octet counter included in the data packet and the quantity of octets of the synchronization protocol header, so that the distributed unit can determine, based on a sum of the quantity of octets of the synchronization protocol header and a quantity of octets of the payload in the PDCP data unit, whether data is lost.

According to a second aspect, this application provides a communication method. The method includes:

A distributed unit receives a PDCP data unit from a centralized unit, where the PDCP data unit includes a PDCP header, a synchronization protocol header, and a payload;

the distributed unit generates a MAC data unit, where the MAC data unit includes a MAC header, an RLC header, the PDCP header, and the payload; and the distributed unit sends the MAC data unit to a terminal.

In a an embodiment, in the PDCP data unit, the synchronization protocol header is located after the PDCP header, and the payload is located after the synchronization protocol header.

The method further includes:

The distributed unit receives PDCP format information sent by the centralized unit, where the PDCP format information includes at least one of the following:

a length of the PDCP header, a PDCP SN length, or a PDCP format indication.

In a an embodiment, in the PDCP data unit, the PDCP header is located after the synchronization protocol header, and the payload is located after the PDCP header.

In a an embodiment, in the PDCP data unit, the payload is located after the PDCP header, and the synchronization protocol header is located after the payload.

In a an embodiment, the PDCP data unit includes the PDCP header and a second synchronization packet data unit located after the PDCP header, and the second synchronization packet data unit is obtained by reversing a bit stream of a first synchronization packet data unit. In the first synchronization packet data unit, the payload is located after the synchronization protocol header.

In a an embodiment, a value of an octet counter included in the synchronization protocol header is a first value.

If a sum of octets of a payload of a PDCP data unit received in a first synchronization sequence is the same as a first value of an octet counter in a current PDCP data unit received in the first synchronization sequence, the DU determines that no data is lost when the current PDCP data unit is received.

If a sum of octets of a payload of a PDCP data unit received in a first synchronization sequence is different from a first value of an octet counter in a current PDCP data unit received in the first synchronization sequence, the DU determines that data is lost when the current PDCP data unit is received.

It should be noted that the current PDCP data unit is a latest PDCP data unit received by the DU from the CU. For example, the DU first receives a PDCP data unit a sent by the CU, and then receives a PDCP data unit b. When the DU receives the PDCP data unit a, the PDCP data unit a is the current PDCP data unit. When the DU receives the PDCP data unit b, the PDCP data unit b is the current PDCP data unit.

In a an embodiment, a value of an octet counter included in the synchronization protocol header is a second value, and the second value is equal to a sum of the first value and a quantity of octets of the PDCP header.

A sum of octets of a payload and octets of a PDCP header of a PDCP data unit received by the distributed unit in a first synchronization sequence is determined.

If the sum of the octets of the payload and the octets of the PDCP header is the same as a second value of an octet counter in a current PDCP data unit received in the first synchronization sequence, the DU determines that no data is lost when the current PDCP data unit is received.

If the sum of the octets of the payload and the octets of the PDCP header is different from a second value of an octet counter in a current PDCP data unit received in the first synchronization sequence, the DU determines that data is lost when the current PDCP data unit is received.

In a an embodiment, a value of an octet counter included in the synchronization protocol header is a second value, and the second value is equal to a sum of the first value and a quantity of octets of the synchronization protocol header.

A sum of octets of a payload and octets of a synchronization protocol header of a PDCP data unit received by the distributed unit in a first synchronization sequence is determined.

If the sum of the octets of the payload and the octets of the synchronization protocol header is the same as a value of an octet counter in a current PDCP data unit received in the first synchronization sequence, the DU determines that no data is lost when the current PDCP data unit is received.

If the sum of the octets of the payload and the octets of the synchronization protocol header is different from a value of an octet counter in a current PDCP data unit received in the first synchronization sequence, the DU determines that data is lost when the current PDCP data unit is received.

In a an embodiment, the synchronization protocol header includes a first octet counter.

If a sum of octets of a payload of a PDCP data unit received in a first synchronization sequence is the same as a value of a first octet counter in a current PDCP data unit received in the first synchronization sequence, the DU determines that no data is lost when the current PDCP data unit is received.

If a sum of octets of a payload of a PDCP data unit received in a first synchronization sequence is different from a value of a first octet counter in a current PDCP data unit received in the first synchronization sequence, the DU determines that data is lost when the current PDCP data unit is received.

In a an embodiment, the synchronization protocol header includes a second octet counter, and a value of the second octet counter is equal to a sum of the value of the first octet counter and a quantity of octets of the PDCP header.

A sum of octets of a payload and octets of a PDCP header of a PDCP data unit received by the distributed unit in a first synchronization sequence is determined.

If the sum of the octets of the payload and the octets of the PDCP header is the same as a value of a second octet counter in a current PDCP data unit received in the first synchronization sequence, the DU determines that no data is lost when the current PDCP data unit is received.

If the sum of the octets of the payload and the octets of the PDCP header is different from a value of a second octet counter in a current PDCP data unit received in the first synchronization sequence, the DU determines that data is lost when the current PDCP data unit is received.

In a an embodiment, the synchronization protocol header includes a second octet counter, and a value of the second octet counter is equal to a sum of the value of the first octet counter and a quantity of octets of the synchronization protocol header.

A sum of octets of a payload and octets of a synchronization protocol header of a PDCP data unit received by the distributed unit in a first synchronization sequence is determined.

If the sum of the octets of the payload and the octets of the synchronization protocol header is the same as a value of a second octet counter in a current PDCP data unit received in the first synchronization sequence, the DU determines that no data is lost when the current PDCP data unit is received.

A sum of octets of a payload and octets of a synchronization protocol header of a PDCP data unit received by the distributed unit in a first synchronization sequence is determined.

If the sum of the octets of the payload and the octets of the synchronization protocol header is different from a value of a second octet counter in a current PDCP data unit received in the first synchronization sequence, the DU determines that data is lost when the current PDCP data unit is received.

According to a third aspect, an apparatus is provided. The apparatus provided in this application has functions for implementing behavior of the centralized unit or the distributed unit in the foregoing method aspects, and includes corresponding means (means) configured to perform the operations or functions described in the foregoing method aspects. The operations or functions may be implemented by using software, hardware (such as a circuit), or a combination of hardware and software.

In an embodiment, the apparatus includes one or more processors and a communication unit. The one or more processors are configured to support the apparatus in performing corresponding functions of the centralized unit in the foregoing methods, for example, generating a PDCP data unit based on a data packet. The communication unit is configured to support the apparatus in communicating with another device, to implement a receiving function and/or a sending function, for example, sending the PDCP data unit.

In an embodiment, the apparatus may further include one or more memories. The memory is configured to be coupled to the processor, and the memory stores program instructions and/or data for a network device. The one or more memories may be integrated with the processor, or may be disposed independent of the processor. This is not limited in this application.

The apparatus may be a base station, a gNB, a TRP, or the like. The communication unit may be a transceiver or a transceiver circuit. In an embodiment, the transceiver may alternatively be an input/output circuit or interface.

The apparatus may alternatively be a communication chip. The communication unit may be an input/output circuit or interface of the communication chip.

In another embodiment, the apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method completed by the centralized unit according to any one of the first aspect or the an embodiments of the first aspect.

In an embodiment, the apparatus includes one or more processors and a communication unit. The one or more processors are configured to support the apparatus in performing corresponding functions of the distributed unit in the foregoing methods, for example, generating a MAC data unit. The communication unit is configured to support the apparatus in communicating with another device, to implement a receiving function and/or a sending function, for example, sending the MAC data unit.

In an embodiment, the apparatus may further include one or more memories. The memory is configured to be coupled to the processor, and the memory stores program instructions and/or data for a network device. The one or more memories may be integrated with the processor, or may be disposed independent of the processor. This is not limited in this application.

The apparatus may be a base station, a gNB, a TRP, or the like. The communication unit may be a transceiver or a transceiver circuit. In an embodiment, the transceiver may alternatively be an input/output circuit or interface.

The apparatus may alternatively be a communication chip. The communication unit may be an input/output circuit or interface of the communication chip.

In another embodiment, the apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method completed by the distributed unit according to any one of the second aspect or the an embodiments of the second aspect.

According to a fourth aspect, a system is provided. The system includes the centralized unit and the distributed unit.

According to a fifth aspect, a computer-readable storage medium is provided, and is configured to store a computer program. The computer program includes instructions used to perform the method according to any one of the first aspect or the an embodiments of the first aspect.

According to a sixth aspect, a computer-readable storage medium is provided, and is configured to store a computer program. The computer program includes instructions used to perform the method according to any one of the second aspect or the an embodiments of the second aspect.

According to a seventh aspect, a computer program product is provided. The computer program product includes computer program code. When the computer program code is run on a computer, the computer is enabled to perform the method according to any one of the first aspect or the an embodiments of the first aspect.

According to an eighth aspect, a computer program product is provided. The computer program product includes computer program code. When the computer program code is run on a computer, the computer is enabled to perform the method according to any one of the second aspect or the an embodiments of the second aspect.

BRIEF DESCRIPTION OF DRAWINGS

FIG. 4A and FIG. 4B are a first schematic data packet processing block diagram of a communication method according to an embodiment of this application;

FIG. 5A and FIG. 5B are a second schematic data packet processing block diagram of a communication method according to an embodiment of this application;

FIG. 6A and FIG. 6B are a third schematic data packet processing block diagram of a communication method according to an embodiment of this application;

DESCRIPTION OF EMBODIMENTS

Figure 1:
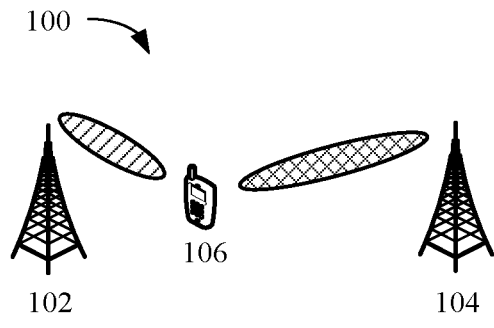
FIG. 1 is a first schematic diagram of a communication system applicable to a communication method according to an embodiment of this application.

The following describes technical solutions in this application with reference to the accompanying drawings.

The technical solutions in embodiments of this application may be applied to various communication systems, for example, a long term evolution (LTE) system, a worldwide interoperability for microwave access (WiMAX) communication system, a future 5th generation (5G) system such as a new radio access technology (NR), and a future communication system such as a 6G system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "for example" in embodiments of this application is used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

In embodiments of this application, information (information), a signal (signal), a message (message), or a channel (channel) may be interchangeably used sometimes. It should be noted that expressed meanings are consistent when differences are not emphasized. "Of (of)", "corresponding (corresponding, relevant)", and "corresponding (corresponding)" may be interchangeably used sometimes. It should be noted that expressed meanings are consistent when differences are not emphasized.

A network architecture and a service scenario that are described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of new service scenarios, the technical solutions provided in embodiments of this application are also applicable to similar technical problems.

Embodiments of this application may be applied to a conventional typical network or a future UE-centric (UE-centric) network. A non-cell (Non-cell) network architecture is introduced to the UE-centric network. To be specific, a large quantity of small cells are deployed in an area to form a hyper cell (Hyper cell). Each small cell is a transmission point (TP) or a transmission reception point (TRP) of the hyper cell, and is connected to a centralized controller (controller). When UE moves in the hyper cell, a network side device selects a new sub-cluster (sub-cluster) for the UE in real time to serve the UE, to avoid a real cell handover, and implement UE service continuity. The network side device includes a wireless network device. Alternatively, in the UE-centric network, a plurality of network side devices such as small cells may have independent controllers such as distributed controllers. Each small cell can independently schedule a user, and information is exchanged between small cells for a long time, so that the small cell can provide a coordinated service for the UE flexibly to some extent.

In embodiments of this application, different base stations may be base stations having different identifiers, or may be base stations that have a same identifier and that are deployed at different geographical locations. Before being deployed, a base station does not know whether the base station is related to a scenario to which embodiments of this application are applied. Therefore, before being deployed, the base station or a baseband chip needs to support a method provided in embodiments of this application. It may be understood that the foregoing base stations having different identifiers may have base station identifications, cell identifiers, or other identifiers.

In embodiments of this application, an NR network scenario in a wireless communication network is used as an example to describe some scenarios. It should be noted that the solutions in embodiments of this application may be further applied to another wireless communication network, and a corresponding name may also be replaced with a name of a corresponding function in the another wireless communication network.

For ease of understanding embodiments of this application, a communication system shown in FIG. 1 is first used as an example to describe in detail a communication system applicable to embodiments of this application. FIG. 1 is a schematic diagram of a communication system applicable to a communication method according to an embodiment of this application. As shown in FIG. 1, the communication system 100 includes a network device 102 and a terminal device 106. A plurality of antennas may be configured for the network device 102, and a plurality of antennas may also be configured for the terminal device. In an embodiment, the communication system may further include a network device 104, and a plurality of antennas may also be configured for the network device 104.

It should be understood that the network device 102 or the network device 104 may further include a plurality of components (for example, a processor, a modulator, a multiplexer, a demodulator, or a de-multiplexer) related to signal sending and receiving.

The network device is a device having a wireless transceiver function or a chip that may be disposed in the device. The device includes but is not limited to: an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (BBU), or an access point (AP), a wireless relay node, a wireless backhaul node, a transmission point (TP), or the like in a wireless fidelity (Wi-Fi) system. Alternatively, the network device may be a gNB or a transmission point (TRP or TP) in a 5G system, such as an NR system, or one antenna panel or a group of antenna panels (including a plurality of antenna panels) of a base station in the 5G system, or may be a network node that constitutes a gNB or a transmission point, for example, a baseband unit (BBU), or a distributed unit (DU).

Figure 2:
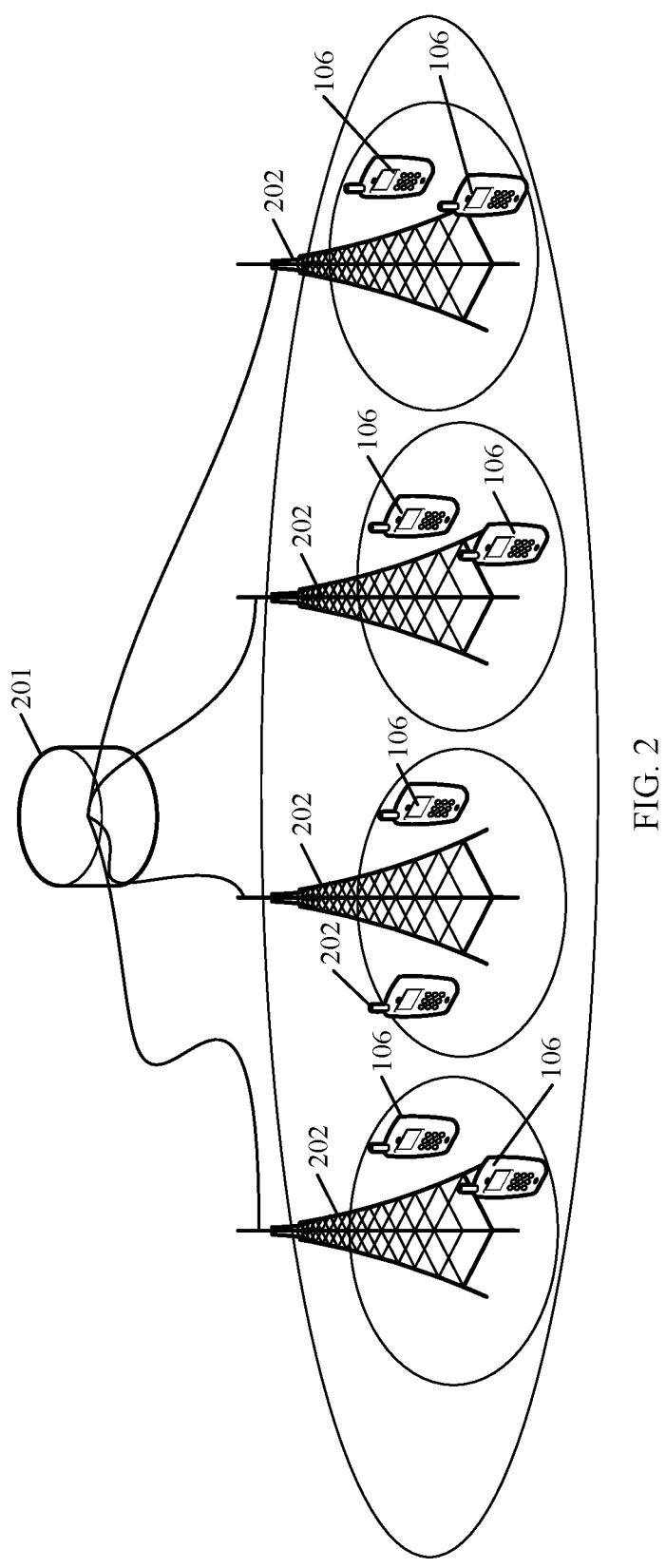
FIG. 2 is a second schematic diagram of a communication system applicable to a communication method according to an embodiment of this application.

As shown in FIG. 2, in some deployments, the gNB may include a centralized unit (CU) 201 and a DU 202. The gNB may further include a radio unit (RU). The CU implements a part of functions of the gNB, and the DU implements a part of functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, it may also be considered that higher layer signaling, such as RRC layer signaling or PDCP layer signaling, may be sent by the DU or sent by the DU and the CU. It can be understood that the network device may be a CU node, a DU node, or a device including a CU node and a DU node. In addition, the CU may be classified as a network device in a radio access network RAN, or the CU may be classified as a network device in a core network CN. This is not limited herein.

The terminal device may also be referred to as user equipment (UE), an access terminal, a subscriber unit, a subscriber station, a mobile station, a mobile station, a remote station, a remote terminal, a mobile device, a user terminal, a terminal, a wireless communication device, a user agent, or a user apparatus. The terminal device in embodiments of this application may be a mobile phone (mobile phone), a tablet (Pad), a computer having a wireless transceiver function, a virtual reality (VR) terminal device, an augmented reality (AR) terminal device, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in embodiments of this application. The terminal device having a wireless transceiver function and a chip that may be disposed in the terminal device are collectively referred to as a terminal device in this application.

In the communication system 100, the network device 102 and the network device 104 each may communicate with a plurality of terminal devices (for example, the terminal device 106 shown in the figure). The network device 102 and the network device 104 may communicate with one or more terminal devices similar to the terminal device 106. However, it should be understood that a terminal device communicating with the network device 102 and a terminal device communicating with the network device 104 may be the same or may be different. The terminal device 106 shown in FIG. 1 may simultaneously communicate with the network device 102 and the network device 104. However, only an example scenario is shown. In some scenarios, the terminal device may communicate with the network device 102 or the network device 104. This is not limited in this application.

It should be understood that FIG. 1 is merely a simplified schematic diagram used as an example for ease of understanding. The communication system may further include another network device or another terminal device that is not shown in FIG. 1.

The following describes in detail embodiments of this application with reference to the accompanying drawings.

It should be understood that the technical solutions in this application may be applied to a wireless communication system, for example, the communication system 100 shown in FIG. 1. The communication system may include at least one network device and at least one terminal device, and the network device and the terminal device may communicate with each other through a wireless air interface. For example, the network device in the communication system may correspond to the network device 102 and the network device 104 shown in FIG. 1, and the terminal device may correspond to the terminal device 106 shown in FIG. 1.

Without loss of generality, the following describes embodiments of this application in detail by using an interaction process between a terminal device and a network device as an example. The terminal device may be a terminal device that is in a wireless communication system and that has a wireless connection relationship with the network device. It may be understood that the network device and a plurality of terminal devices that are in the wireless communication system and that have wireless connection relationships with the network device may transmit a data packet according to the same technical solutions. This is not limited in this application.

It should be understood that, in embodiments of this application, a sequence of a payload, a synchronization protocol header, a PDCP header, a MAC header, and an RLC header is a defined logical data structure, and is a higher-layer data structure. A sequence at a lower layer and when a data unit is processed is not specifically limited in embodiments of this application.

Figure 3:
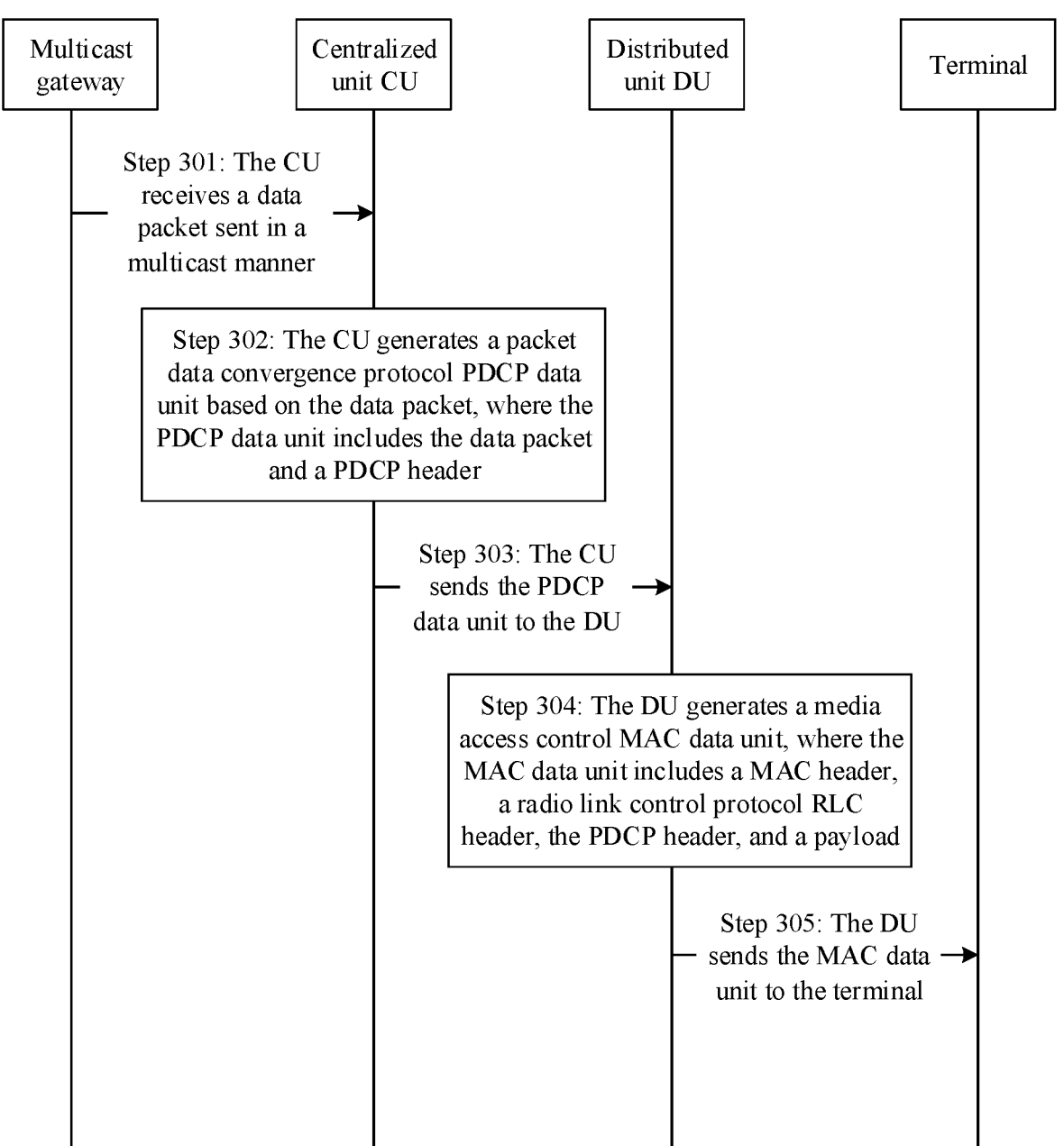
FIG. 3 is a schematic flowchart of a communication method according to an embodiment of this application.

FIG. 3 is an example flowchart of a communication method from a device interaction perspective according to an embodiment of this application. As shown in FIG. 3, the method may include the following operations.

At 301: A centralized unit CU receives a data packet sent in a multicast manner.

The data packet herein may be an MBMS data packet, and is sent to the CU by a multicast gateway, an MBMS gateway, or a BM-SC. The MBMS data packet may be a synchronization packet data unit. The data packet herein may include a synchronization protocol header and a payload. That the data packet is sent in the multicast manner means that the data packet is sent to a terminal in the multicast manner.

At 302: The CU generates a PDCP data unit based on the data packet, where the PDCP data unit includes the data packet and a PDCP header.

At 303: The CU sends the PDCP data unit to a DU.

A synchronization protocol is transparent to the CU. The CU may not need to parse the synchronization protocol header, and may directly transparently transmit the PDCP data unit including the synchronization protocol header to the DU.

At 304: The DU generates a MAC data unit, where the MAC data unit includes a MAC header, an RLC header, the PDCP header, and the payload.

At 305: The DU sends the MAC data unit to the terminal.

The following describes different implementation methods of the embodiment shown in FIG. 3.

In an embodiment, the data packet received by the CU at 301 may be a synchronization packet data unit, or the data packet may include the synchronization packet data unit. The synchronization packet data unit may include a synchronization protocol header and a payload. The payload is located after the synchronization protocol header. The PDCP data unit generated by the CU based on the data packet at 302 may include the PDCP header, the synchronization protocol header, and the payload. The PDCP header is located before the synchronization protocol header.

In an embodiment, the CU may send PDCP format information to the DU. The DU generates a MAC data unit based on the PDCP format information and the PDCP data unit, and sends the MAC data unit to the terminal. The PDCP format information includes at least one of the following: a length of the PDCP header, a PDCP serial number SN length, or a PDCP format indication.

It should be noted that the PDCP format information and the PDCP data unit may be simultaneously sent to the DU, or the CU may send the PDCP format information to the DU after sending the PDCP data unit. This is not specifically limited in this application.

The following describes the PDCP format information in detail.

(1) PDCP serial number SN length: In an NR system, a PDCP SN may be 12 bits or 18 bits. The information may explicitly indicate 12 bits or 18 bits. Alternatively, the information may indicate 12 bits or 18 bits by using one bit. For example, "0" indicates 12 bits and "1" indicates 18 bits (or "1" indicates 12 bits and "0" indicates 18 bits). Alternatively, a Boolean format is used to indicate 12 bits or 18 bits. For example, true indicates 12 bits and false indicates 18 bits (or true indicates 18 bits and false indicates 12 bits). Alternatively, one information element (information element, IE) is used to indicate 12 bits or 18 bits. For example, that the CU sends the IE to the DU indicates 12 bits, and that the CU does not send the IE to the DU indicates 18 bits.

(2) Length of the PDCP header: In the NR system, the length of the PDCP header may be 2 bytes or 3 bytes. The information may explicitly indicate 2 bytes or 3 bytes. Alternatively, one bit may be used to indicate 2 bytes or 3 bytes. For example, "0" indicates 2 bytes and "1" indicates 3 bytes, or "0" indicates 3 bytes and "1" indicates 2 bytes. Alternatively, a Boolean format may be used to indicate 2 bytes or 3 bytes. For example, true indicates 2 bytes and false indicates 3 bytes, or true indicates 3 bytes and false indicates 2 bytes. Alternatively, one IE may be used to indicate 2 bytes or 3 bytes. For example, that the CU sends the IE to the DU indicates 2 bytes, and that the CU does not send the IE to the DU indicates 3 bytes.

(3) PDCP format indication: In the NR system, a PDCP PDU used for data transmission has two formats, and the PDCP format indication may indicate format 0 and format 1 respectively corresponding to two PDCP formats.

Figure 4A:
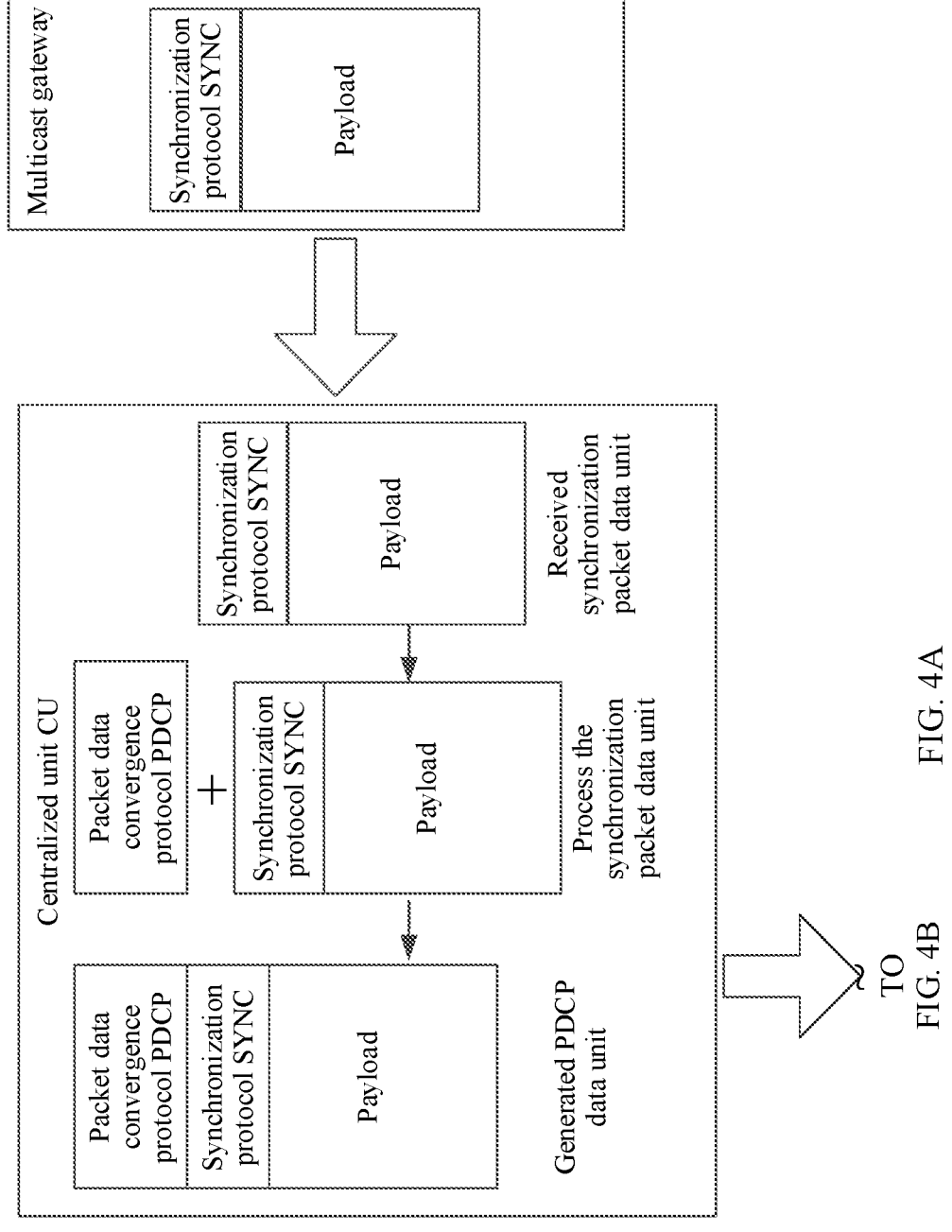

The following describes the foregoing implementation method in detail with reference to the accompanying drawing. As shown in FIG. 4A and FIG. 4B, when the MBMS gateway or the BM-SC sends a synchronization packet data unit, a synchronization protocol (SYNC) header is before a payload (Payload). After receiving the synchronization packet data unit, the CU adds a PDCP header before the synchronization protocol header, to generate a PDCP data unit. The CU sends the PDCP data unit and PDCP format information to the DU. After receiving the PDCP data unit and the PDCP format information, the DU generates a MAC data unit. The MAC data unit includes a MAC header, an RLC header after the MAC header, the PDCP header after the RLC header, and the payload after the PDCP header. The DU sends the MAC data unit to the terminal.

In the present disclosure, that A is after (or before) B means that a bit stream of A is after (or before) a bit stream of B. For example, if the bit stream of A is 01010111, and the bit stream of B is 1010111100, a combination manner in which A is after B is 101011110001010111, and a combination manner in which A is before B is 010101111010111100.

In the foregoing method, in a CU-DU architecture, the data packet sent in the multicast manner can be processed, to support sending of a multimedia broadcast service in a broadcast form, and enhance a sending effect of the multimedia broadcast service. In addition, the CU sends the PDCP format information to the DU, so that the DU can accurately determine the length of the PDCP header, and further accurately determine a start position of the synchronization protocol header, to read and remove the synchronization protocol header.

In another embodiment, the data packet received by the CU at 301 may be a synchronization packet data unit. The synchronization packet data unit includes a synchronization protocol header and a payload after the synchronization protocol header. The PDCP data unit generated by the CU based on the data packet at 302 may include the PDCP header, the payload after the PDCP header, and the synchronization protocol header after the payload. The following describes this embodiment in detail with reference to FIG. 5A to FIG. 6B.

Figure 5A:
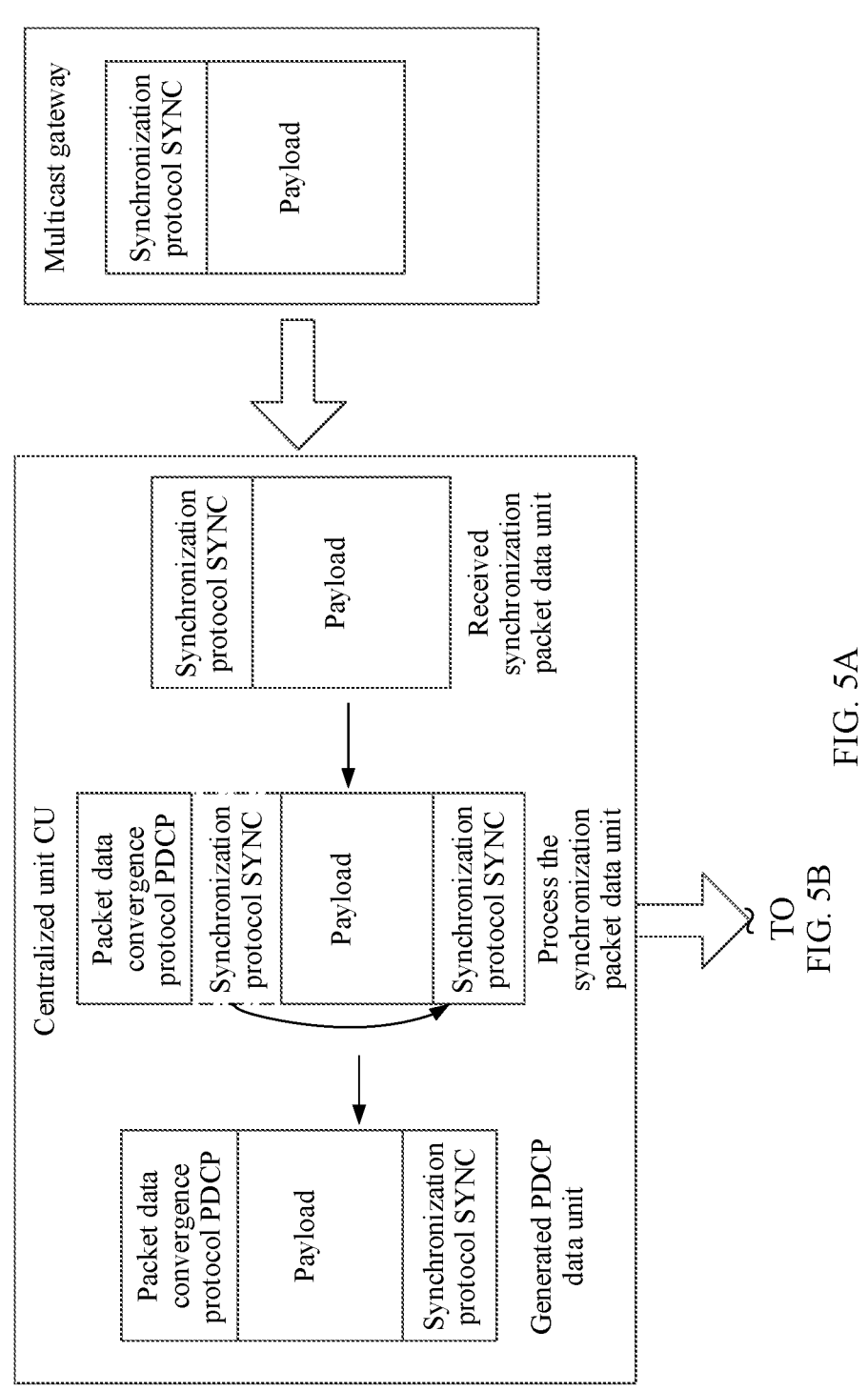
Figure 5B:
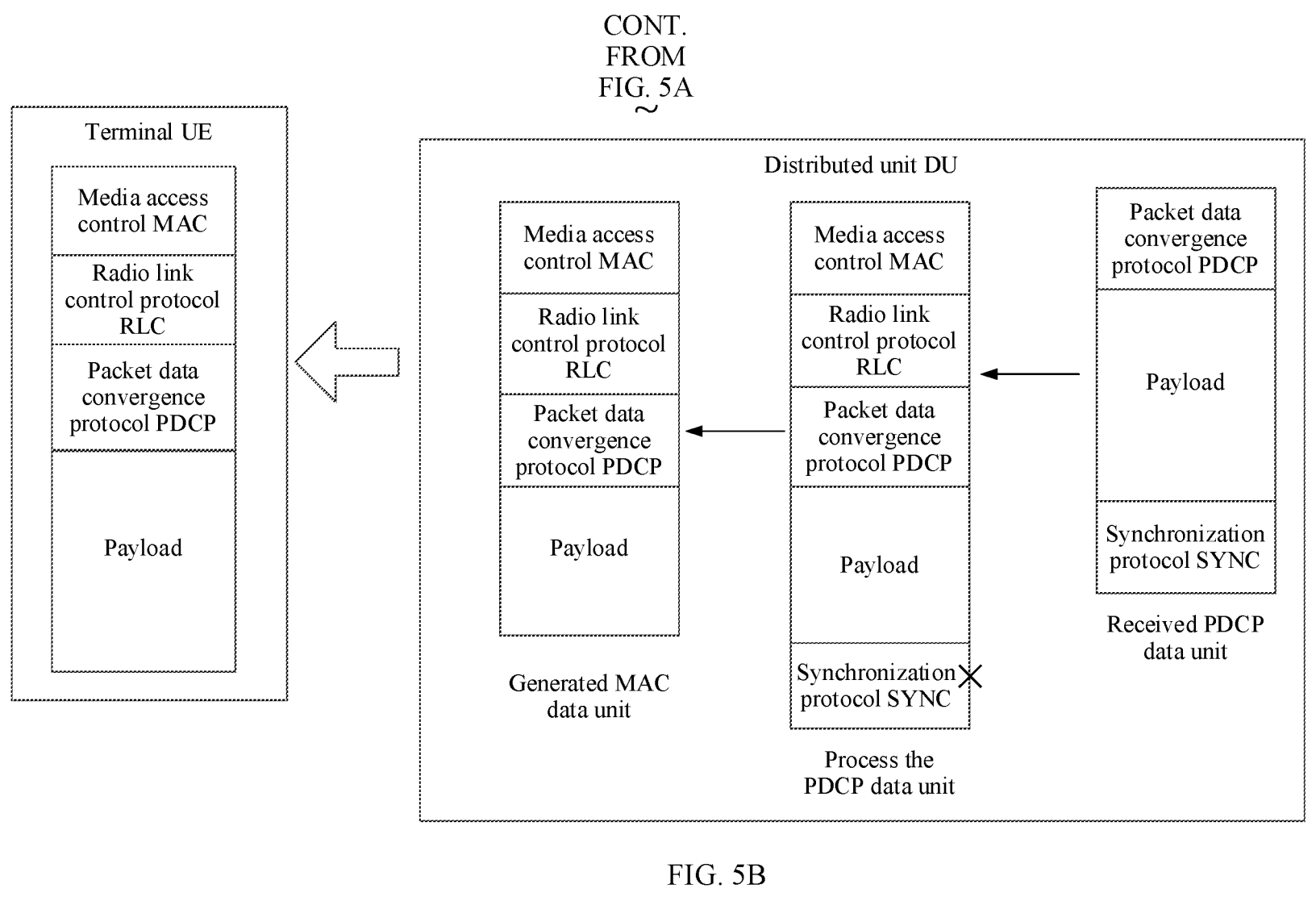

A feasible example is shown in FIG. 5A and FIG. 5B. When the multicast gateway, the MBMS gateway, or the BM-SC sends a synchronization packet data unit, a synchronization protocol header is before a payload. After receiving the synchronization packet data unit, the CU moves the synchronization protocol header in the synchronization packet data unit to after the payload (as shown in FIG. 5A, moves the synchronization protocol header from a dashed-line box SYNC to a solid-line box SYNC), and adds a PDCP header before the payload, to generate a PDCP data unit. Therefore, the PDCP data unit includes the PDCP header, the payload after the PDCP header, and the synchronization protocol header after the payload. The CU sends the PDCP data unit to the DU. The DU generates a MAC data unit based on the PDCP data unit, where the MAC data unit includes a MAC header, an RLC header after the MAC header, the PDCP header after the RLC header, and the payload after the PDCP header. The DU sends the MAC data unit to the terminal.

Figure 6A:
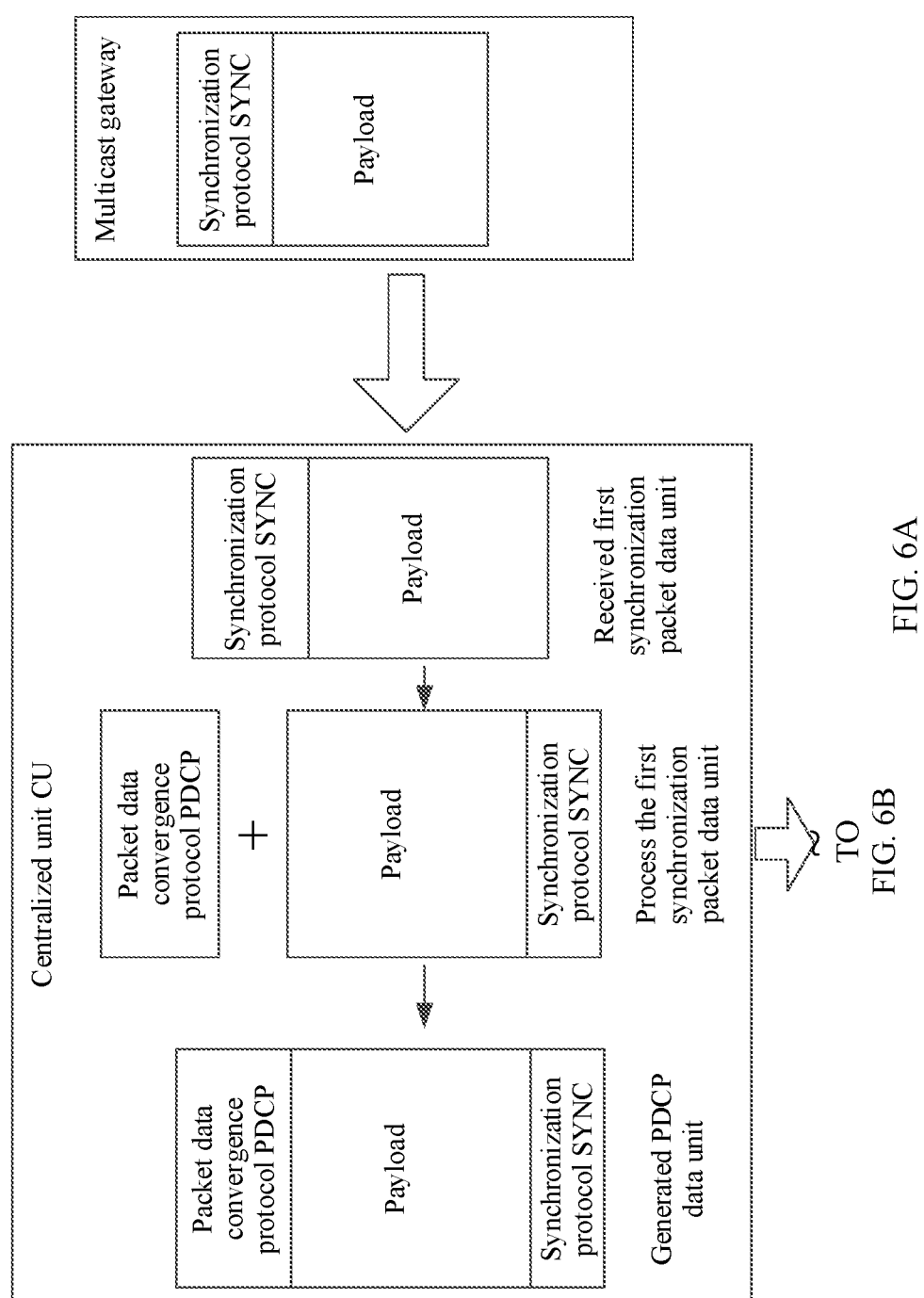

Another feasible example is shown in FIG. 6A and FIG. 6B. The multicast gateway, the MBMS gateway, or the BM-SC sends a data packet. The data packet may be a first synchronization packet data unit, or the data packet may include the first synchronization packet data unit. The first synchronization packet data unit includes a synchronization protocol header and a payload after the synchronization protocol header. After receiving the first synchronization packet data unit, the CU reverses a bit stream of the first synchronization packet data unit to obtain a second synchronization packet data unit. For example, if the bit stream of the first synchronization packet data unit is 0100011111, where a bit stream of the synchronization protocol header is 01, and a bit stream of the payload is 00011111, a bit stream of the second synchronization packet data unit is 1111100010. That is, the second synchronization packet data unit is obtained by reversing the bit stream of the first synchronization packet data unit. The CU adds a PDCP header before a payload of the second synchronization packet data unit, to generate a PDCP data unit. The CU sends the PDCP data unit to the DU. The DU generates a MAC data unit based on the PDCP data unit, where the MAC data unit includes a MAC header, an RLC header after the MAC header, the PDCP header after the RLC header, and the payload that is in the second synchronization packet data unit and that is after the PDCP header. The DU sends the MAC data unit to the terminal.

In the foregoing method, the CU does not need to send PDCP format information to the DU, and the DU may directly remove the synchronization protocol header from the rear of the PDCP data unit, and add the RLC header and the MAC header, so that a quantity of times of signaling interworking between the CU and the DU can be reduced.

In still another embodiment, the data packet received by the CU at 301 may be a synchronization packet data unit. The synchronization packet data unit includes a payload, and a synchronization protocol header after the payload. The PDCP data unit generated by the CU based on the data packet at 302 may include the PDCP header, the payload after the PDCP header, and the synchronization protocol header after the payload. The following describes the foregoing method in detail with reference to the accompanying drawing.

Figure 7A:
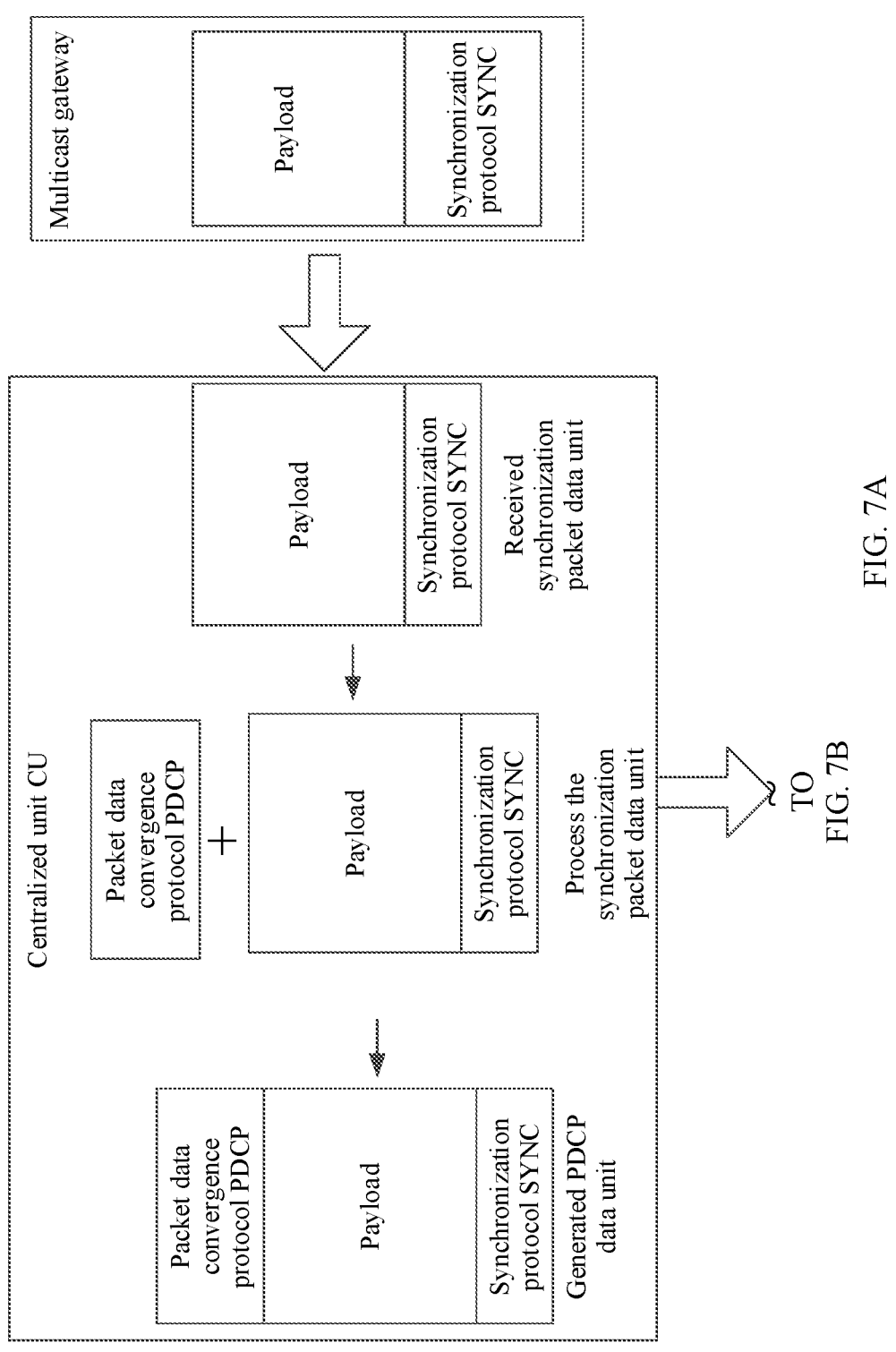
FIG. 7A and FIG. 7B are a fourth schematic data packet processing block diagram of a communication method according to an embodiment of this application.
Figures 7A, 7B:
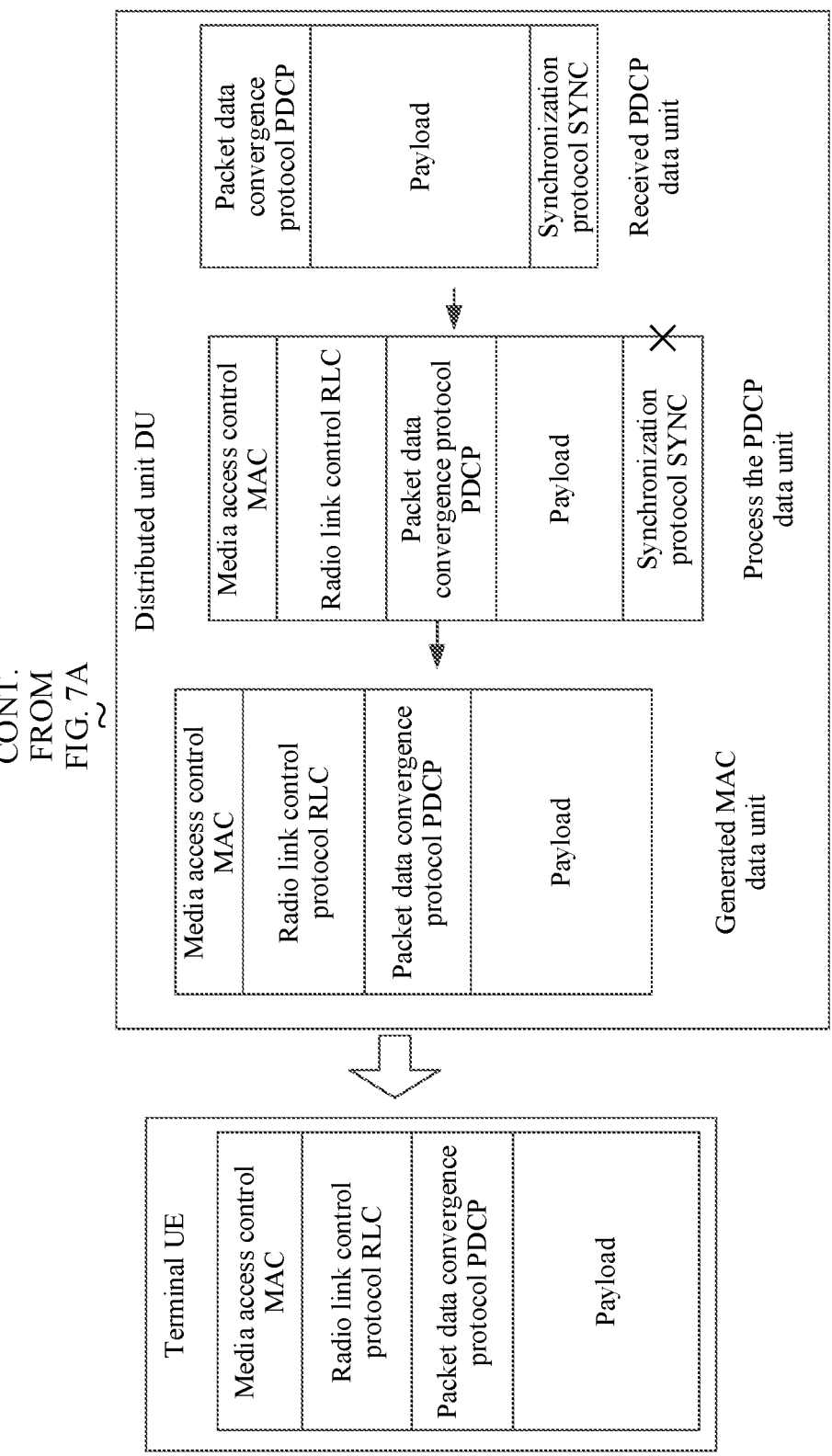

As shown in FIG. 7A and FIG. 7B, when the multicast gateway, the MBMS gateway, or the BM-SC sends a synchronization packet data unit, a synchronization protocol header is after a payload. After receiving the synchronization packet data unit, the CU adds a PDCP header before the payload, to generate a PDCP data unit. Therefore, the PDCP data unit includes the PDCP header, the payload after the PDCP header, and the synchronization protocol header after the payload. The CU sends the PDCP data unit to the DU. The DU generates a MAC data unit based on the PDCP data unit. The MAC data unit includes a MAC header, an RLC header after the MAC header, the PDCP header after the RLC header, and the payload after the PDCP header. The DU sends the MAC data unit to the terminal.

In the foregoing method, the CU may directly add the PDCP header before the synchronization packet data unit, and does not need to send PDCP format information to the DU, so that a quantity of times of signaling interworking between the CU and the DU can be reduced.

In yet another embodiment, the data packet received by the CU at 301 may be a synchronization packet data unit. The synchronization packet data unit includes a synchronization protocol header and a payload after the synchronization protocol header. The PDCP data unit generated by the CU based on the data packet at 302 may include the PDCP header and the synchronization packet data unit after the PDCP header. The following describes the foregoing method in detail with reference to the accompanying drawing.

Figure 8A:
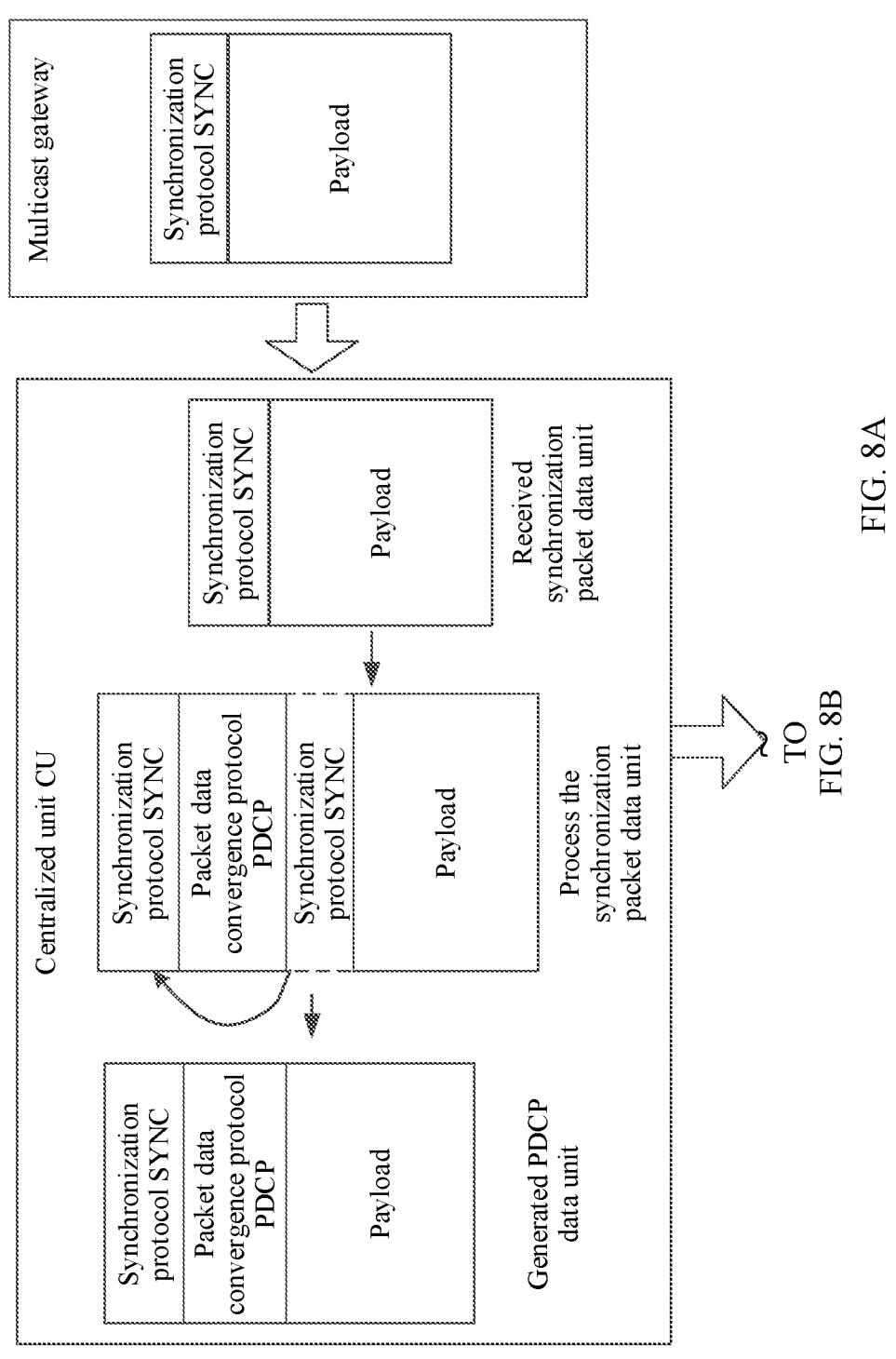
FIG. 8A and FIG. 8B are a fifth schematic data packet processing block diagram of a communication method according to an embodiment of this application.
Figure 8B:
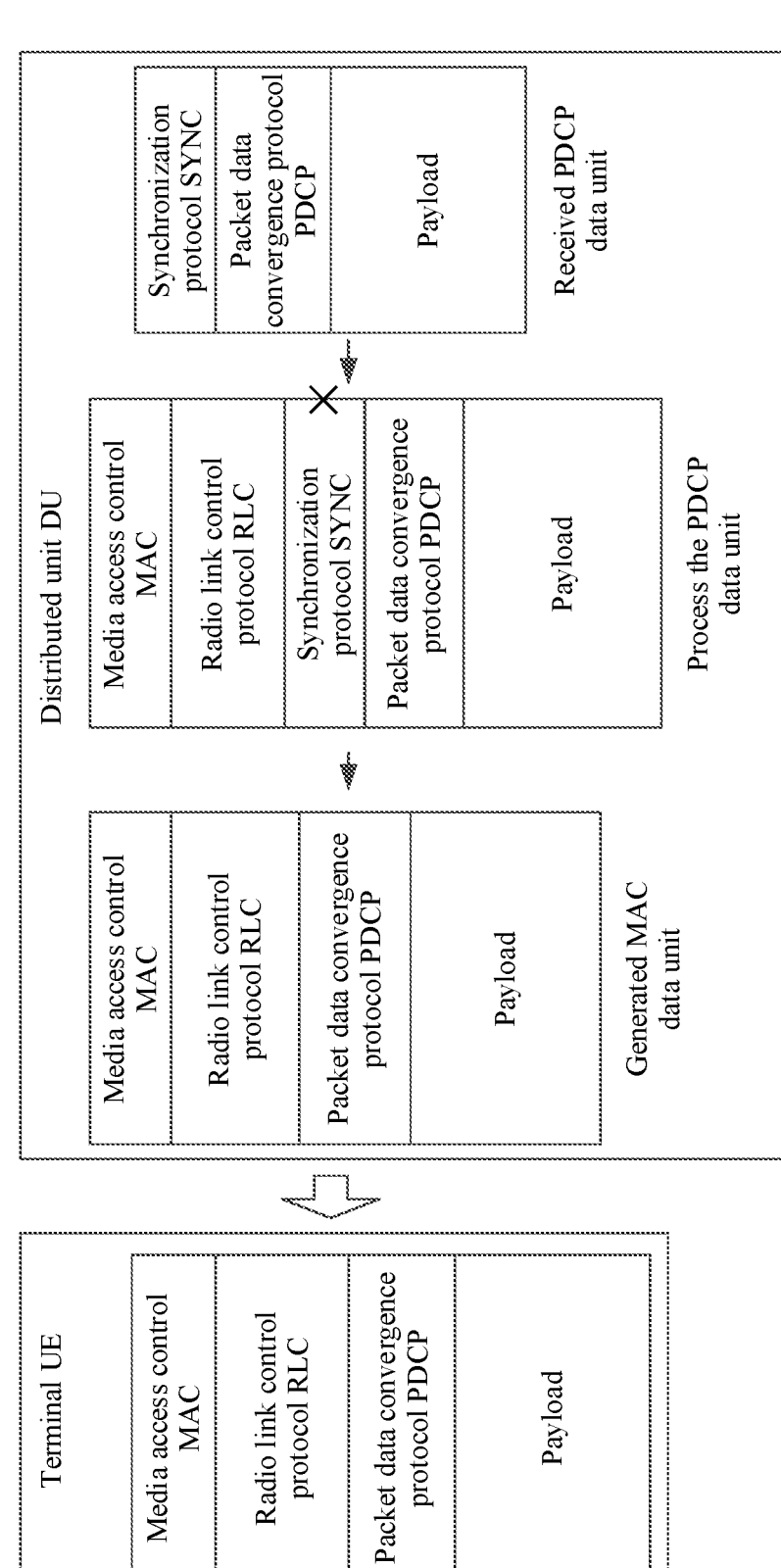

As shown in FIG. 8A and FIG. 8B, when the multicast gateway, the MBMS gateway, or the BM-SC sends a synchronization packet data unit, a synchronization protocol header is before a payload. After receiving the synchronization packet data unit, the CU generates a PDCP data unit. When generating the PDCP data unit, the CU needs to remove the synchronization protocol header, and add a PDCP header before the payload. After adding the PDCP header, the CU needs to add the removed synchronization protocol header before the PDCP header. Therefore, the PDCP data unit generated by the CU includes the PDCP header and the synchronization packet data unit after the PDCP header. The CU sends the PDCP data unit to the DU. The DU generates a MAC data unit based on the PDCP data unit. The MAC data unit includes a MAC header, an RLC header after the MAC header, the PDCP header after the RLC header, and the payload after the PDCP header. The DU sends the MAC data unit to the terminal.

In the foregoing method, the CU does not need to send PDCP format information to the DU, and the DU may directly remove the synchronization protocol header from the front of the PDCP data unit, and add the RLC header and the MAC header, so that signaling interworking between the CU and the DU is reduced.

Figure 9:
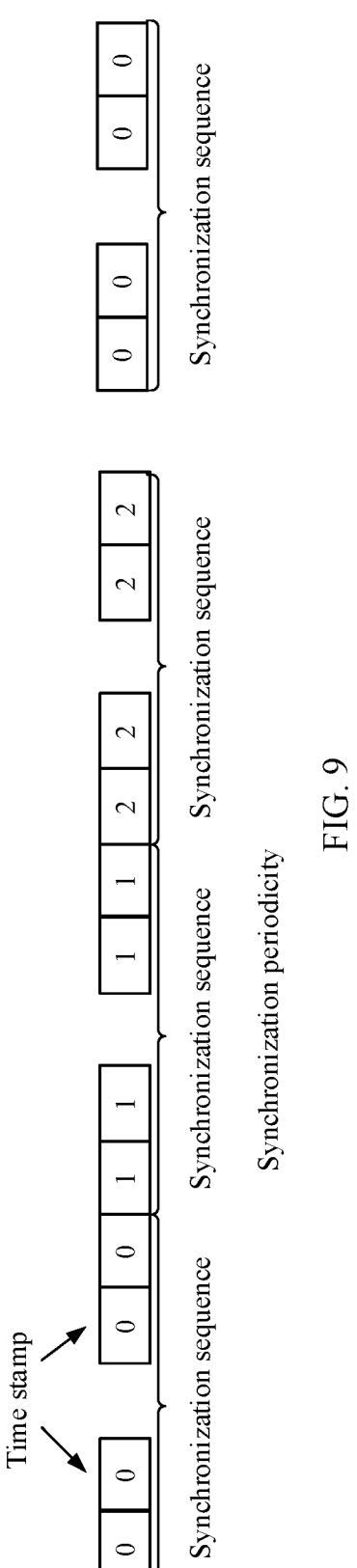
FIG. 9 is a schematic diagram of a time stamp according to an embodiment of this application.

In the technical solutions provided in embodiments of this application, the DU receives the PDCP data unit from the CU or the multicast gateway, or the CU receives the synchronization protocol data unit from the multicast gateway. In the technical solutions provided in embodiments of this application, the DU may further determine, based on the synchronization protocol header, whether data is lost. The synchronization protocol header includes at least one of the following:

(1) Time stamp (Time Stamp): As shown in FIG. 9, the time stamp is a relative value of start time of a synchronization sequence (synchronization sequence) in a synchronization periodicity (synchronization period). For example, a leftmost data packet marked with 0 is a data packet of the $1^{st}$ synchronization sequence in the synchronization periodicity. The synchronization sequence is data packets marked with the same time stamp. A leftmost data packet marked with 1 is a data packet of the $2^{nd}$ synchronization sequence in the synchronization periodicity, and start time of the data packet relative to start time of the synchronization periodicity is one unit time (where for example, one unit time is 10 ms), and so on.

(2) Quantity of data packets (Packet Number): The quantity of data packets is a quantity of elapsed data packets in one synchronization sequence.

(3) Octet counter (Elapsed Octet Counter): The octet counter indicates a total quantity of elapsed octets in one synchronization sequence. For example, in one synchronization sequence, a size of a data packet a is 100 octets, and a size of a data packet b is 150 octets. When the BM-SC sends a data packet c, an octet counter in a synchronization protocol header of the data packet c indicates 250 octets. For another example, in one synchronization sequence, a size of a data packet a is 100 octets, a size of a data packet b is 150 octets, and a size of a data packet c is 200 octets. When the BM-SC sends the data packet c, an octet counter in a synchronization protocol header of the data packet c indicates 450 octets.

(4) Total quantity of data packets (Total Number of Packet): The total quantity of data packets is a total quantity of data packets of an MBMS service in one synchronization periodicity.

(5) Total quantity of octets (Total Number of Octet): The total quantity of octets is a total quantity of octets of an MBMS data packet in one synchronization periodicity.

In an embodiment, the CU receives a synchronization packet data unit (SYNC PDU or SYNC packet) from the multicast gateway, where the synchronization packet data unit includes a synchronization protocol header and a payload, and the synchronization protocol header includes an octet counter. The CU encapsulates the synchronization packet data unit into a PDCP data unit, and sends the PDCP data unit to the DU. The DU receives the PDCP data unit, and learns that a value of the octet counter included in the synchronization protocol header is a first value. The DU determines that a sum of octets of an elapsed payload in a first synchronization sequence is recorded as a second value. If the DU determines that the first value is equal to the second value, the DU determines that no multicast data is lost. If the first value is not equal to the second value, the DU determines that multicast data is lost.

The following describes the foregoing method.

For example, the DU receives the first three PDCP data units in a first synchronization sequence, and the first three PDCP data units are respectively a PDCP data unit a, a PDCP data unit b, and a PDCP data unit c in a receiving sequence. A value of an octet counter included in a synchronization protocol header of the PDCP data unit c is 350 bytes. The DU calculates a sum of octets of payloads of the PDCP data unit a and the PDCP data unit b. If the calculated sum of the octets of the payloads is 350 bytes, the DU determines that no data is lost when the PDCP data unit c is received. If the calculated sum of the octets of the payloads is not 350 bytes, the DU determines that data is lost when the PDCP data unit c is received.

In the foregoing method, the DU may determine, based on the sum of the octets of the elapsed payload, whether the multicast data is lost, and the DU may ignore a quantity of octets of a PDCP header.

In another embodiment, the CU receives a synchronization packet data unit (SYNC PDU or SYNC packet) from the multicast gateway, where the synchronization packet data unit includes a synchronization protocol header and a payload, and the synchronization protocol header includes an octet counter. The CU encapsulates the synchronization packet data unit into a PDCP data unit, and sends the PDCP data unit to the DU. The DU receives the PDCP data unit, and learns that a value of an octet counter in the PDCP data unit is a first value. The DU determines a sum of octets of a payload of a PDCP data unit received in a first synchronization sequence. If the sum of the octets of the payload of the PDCP data unit is the same as the first value, the DU determines that no data is lost when the current PDCP data unit is received. If the sum of the octets of the payload of the PDCP data unit is different from the first value, the DU determines that data is lost when the current PDCP data unit is received.

It should be noted that the first synchronization sequence herein may be one synchronization sequence, two synchronization sequences, or three synchronization sequences. This is not specifically limited in this application. The following describes the foregoing method in detail.

For example, the DU receives three PDCP data units in a first synchronization sequence, and the three PDCP data units are respectively a PDCP data unit a, a PDCP data unit b, and a PDCP data unit c in a receiving sequence. When receiving the PDCP data unit c, the DU learns that a value of an octet counter included in a synchronization protocol header of the PDCP data unit c is 350 bytes. The DU calculates a sum of octets of payloads of the PDCP data unit a, the PDCP data unit b, and the PDCP data unit c. If the calculated sum of the octets of the payloads is 350 bytes, it is determined that no data is lost in the first synchronization sequence. If the calculated sum of the octets of the payloads is not 350 bytes, it is determined that data is lost in the first synchronization sequence.

In the foregoing method, the DU may determine, based on the sum of octets of the payload of the PDCP data unit received in the first synchronization sequence, whether multicast data is lost in the first synchronization sequence, and the DU may ignore a quantity of octets of a PDCP header.

In still another embodiment, the CU receives a synchronization packet data unit (SYNC PDU or SYNC packet) from the multicast gateway, where the synchronization packet data unit includes a synchronization protocol header and a payload, and a value of an octet counter included in the synchronization protocol header is a first value. The CU encapsulates the synchronization packet data unit into a PDCP data unit, and sends the PDCP data unit to the DU. The DU receives the PDCP data unit, and learns that a value of an octet counter in the PDCP data unit is a second value. The second value is a sum of the first value and octets of a PDCP header. The DU determines a sum of octets of a payload and octets of a PDCP header of a PDCP data unit received in a first synchronization sequence. If the sum of the octets of the payload and the octets of the PDCP header of the PDCP data unit is the same as the second value, the DU determines that no data is lost when the PDCP data unit is received. If the sum of the octets of the payload and the octets of the PDCP header of the PDCP data unit is different from the second value, the DU determines that data is lost when the PDCP data unit is received.

It should be noted that the first synchronization sequence herein may be one synchronization sequence, two synchronization sequences, or three synchronization sequences. This is not specifically limited in this application. The following describes the foregoing with reference to FIG. 10.

Figure 10:
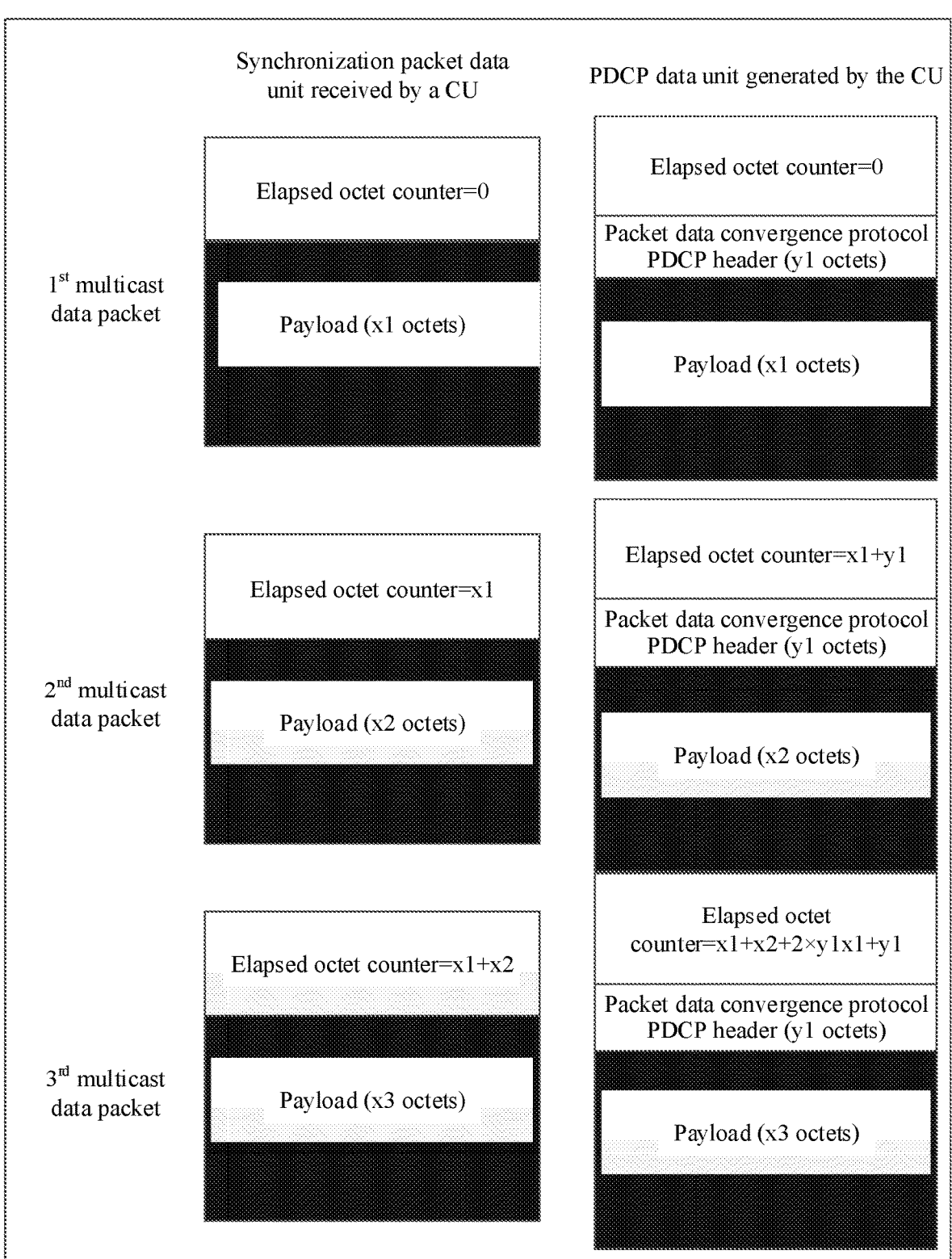
FIG. 10 is a first schematic diagram of generating a PDCP data unit by a centralized unit according to an embodiment of this application.

As shown in FIG. 10, the CU receives the $1^{st}$ multicast data packet, where a value of an octet counter in the $1^{st}$ multicast data packet is 0, and a payload has x1 octets. The CU generates a first PDCP data unit based on the $1^{st}$ multicast data packet, where a value of an octet counter in the first PDCP data unit is 0, a PDCP header has y1 octets, and the payload has the x1 octets. The CU sends the first PDCP data unit to the DU. The CU receives the $2^{nd}$ multicast data packet, where a value of an octet counter in the $2^{nd}$ multicast data packet is a sum of octets of the elapsed payload in a first synchronization sequence, namely, x1, and a payload has x2 octets. The CU generates a second PDCP data unit based on the $2^{nd}$ multicast data packet, where a value of an octet counter in the second PDCP data unit is a sum of octets of the elapsed payload and PDCP header in the first synchronization sequence, namely, x1+y1, a PDCP header has y1 octets, and the payload has the x2 octets. The CU sends the second PDCP data unit to the DU. The CU receives the $3^{rd}$ multicast data packet, where a value of an octet counter in the $3^{rd}$ multicast data packet is x1+x2, and a payload has x3 octets. The CU generates a third PDCP data unit based on the $3^{rd}$ multicast data packet, where a value of an octet counter in the third PDCP data unit is x1+x2+2×y1, a PDCP header has y1 octets, and the payload has the x3 octets. The CU sends the PDCP data unit to the DU.

The DU receives the first PDCP data unit, the second PDCP data unit, and the third PDCP data unit in the first synchronization sequence. When receiving the second PDCP data unit, the DU learns that the value of the octet counter in the second PDCP data unit is x1+y1. When the DU learns that the sum of the octets of the payload and the octets of the PDCP header of the elapsed first PDCP data unit in the first synchronization sequence is x1+y1, the DU determines that no multicast data is lost when the second PDCP data unit is received. When receiving the third PDCP data unit, the DU learns that the value of the octet counter in the third PDCP data unit is x1+x2+2×y1. The DU calculates a sum of octets of the payloads and the PDCP headers of the elapsed first PDCP data unit and second PDCP data unit in the first synchronization sequence. When the DU determines that the sum of the octets of the payloads and the PDCP headers of the first PDCP data unit and the second PDCP data unit is equal to x1+x2+2×y1, the DU determines that no multicast data is lost when the third PDCP data unit is received.

In yet another embodiment, the CU receives a synchronization packet data unit (SYNC PDU or SYNC packet) from the multicast gateway, where the synchronization packet data unit includes a synchronization protocol header and a payload, and a value of an octet counter included in the synchronization protocol header is a first value. The CU encapsulates the synchronization packet data unit into a PDCP data unit, and sends the PDCP data unit to the DU. The DU receives the PDCP data unit, and learns that a value of an octet counter in the PDCP data unit is a second value. The second value is a sum of the first value and octets of a PDCP header. The DU determines a sum of octets of payloads and octets of PDCP headers of all PDCP data units received in a first synchronization sequence. If the sum of the octets of the payloads and the octets of the PDCP headers of the PDCP data units is the same as the second value, the DU determines that no data is lost when the PDCP data unit is received. If the sum of the octets of the payloads and the octets of the PDCP headers of the PDCP data units is different from the second value, the DU determines that data is lost when the PDCP data unit is received.

It should be noted that the first synchronization sequence herein may be one synchronization sequence, two synchronization sequences, or three synchronization sequences. This is not specifically limited in this application. The following describes the foregoing method in detail with reference to FIG. 11 and FIG. 12.

Figure 11:
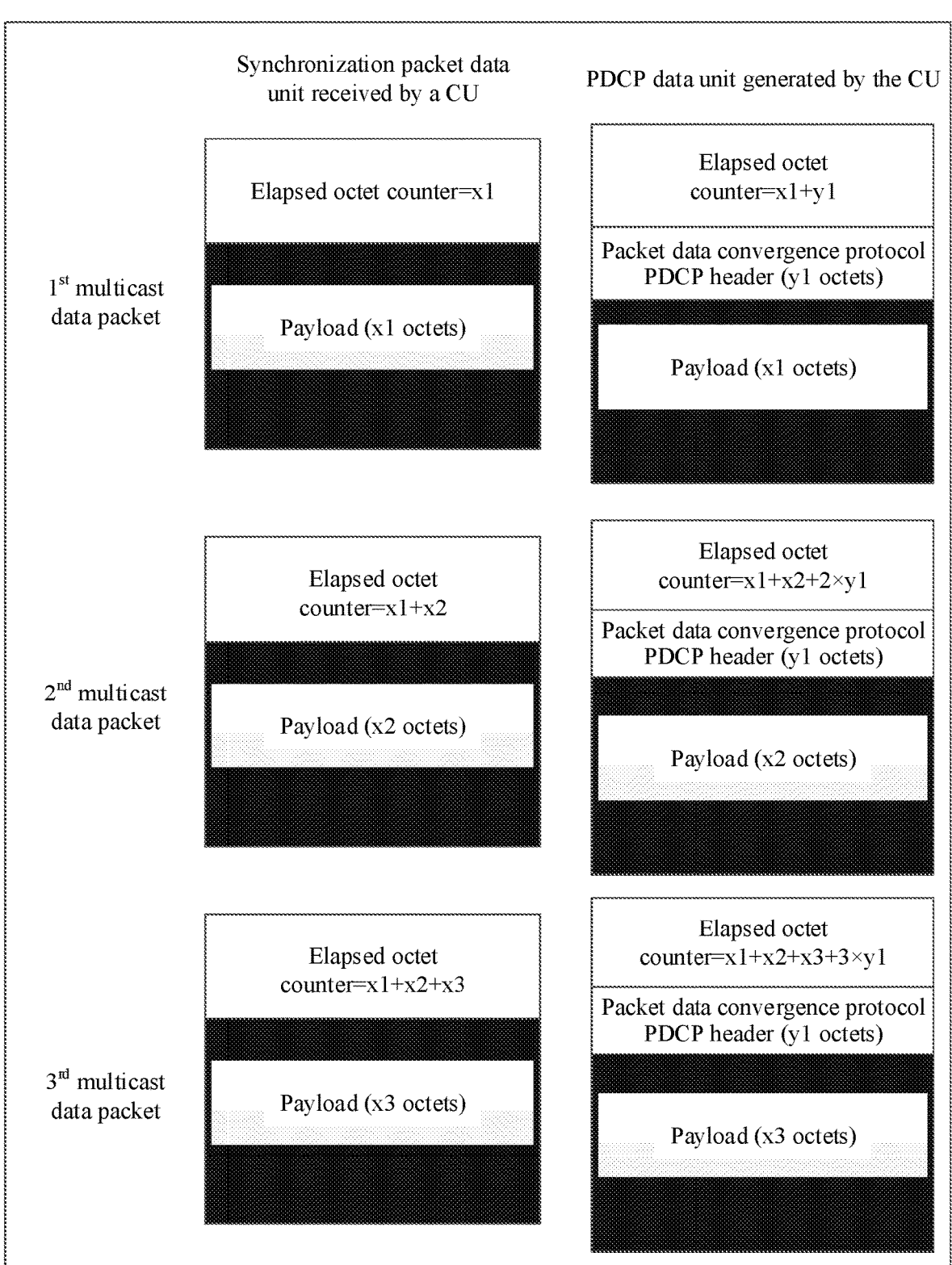
FIG. 11 is a second schematic diagram of generating a PDCP data unit by a centralized unit according to an embodiment of this application.

As shown in FIG. 11, the CU receives the $1^{st}$ multicast data packet, where a value of an octet counter in the $1^{st}$ multicast data packet is a sum of octets of a payload received by the CU in a first synchronization sequence, and the payload has x1 octets. The CU generates a first PDCP data unit based on the $1^{st}$ multicast data packet, where a value of an octet counter in the first PDCP data unit is a sum of the octets of the payload received by the CU and octets of a PDCP header added by the CU in the first synchronization sequence, namely, x1+y1, the PDCP header has y1 octets, and the payload has the x1 octets. The CU sends the first PDCP data unit to the DU. The CU receives the $2^{nd}$ multicast data packet, where a value of an octet counter in the $2^{nd}$ multicast data packet is a sum of octets of payloads received in the first synchronization sequence, namely, x1+x2, and a payload has x2 octets. The CU generates a second PDCP data unit based on the $2^{nd}$ multicast data packet, where a value of an octet counter in the second PDCP data unit is x1+x2+2×y1, a PDCP header has y1 octets, and the payload has the x2 octets. The CU sends the second PDCP data unit to the DU. The CU receives the $3^{rd}$ multicast data packet, where a value of an octet counter in the $3^{rd}$ multicast data packet is x1+x2+x3, and a payload has x3 octets. The CU generates a third PDCP data unit based on the $3^{rd}$ multicast data packet, where a value of an octet counter in the third PDCP data unit is x1+x2+x3+3×y1, a PDCP header has y1 octets, and the payload has the x3 octets. The CU sends the PDCP data unit to the DU.

The DU receives the first PDCP data unit, the second PDCP data unit, and the third PDCP data unit in the first synchronization sequence. When receiving the second PDCP data unit, the DU learns that the value of the octet counter in the second PDCP data unit is x1+x2+2×y1. When the DU learns that a sum of octets of payloads and octets of PDCP headers of the elapsed first PDCP data unit in the first synchronization sequence is x1+x2+2×y1, the DU determines that no multicast data is lost when the second PDCP data unit is received. When receiving the third PDCP data unit, the DU learns that the value of the octet counter in the third PDCP data unit is x1+x2+x3+3×y1. The DU calculates a sum of octets of payloads and PDCP headers of the first PDCP data unit, the second PDCP data unit, and the third PDCP data unit received in the first synchronization sequence. When the DU determines that the sum of the octets of the payloads and the PDCP headers of the first PDCP data unit and the second PDCP data unit is equal to x1+x2+x3+3×y1, the DU determines that no multicast data is lost when the third PDCP data unit is received.

Figure 12:
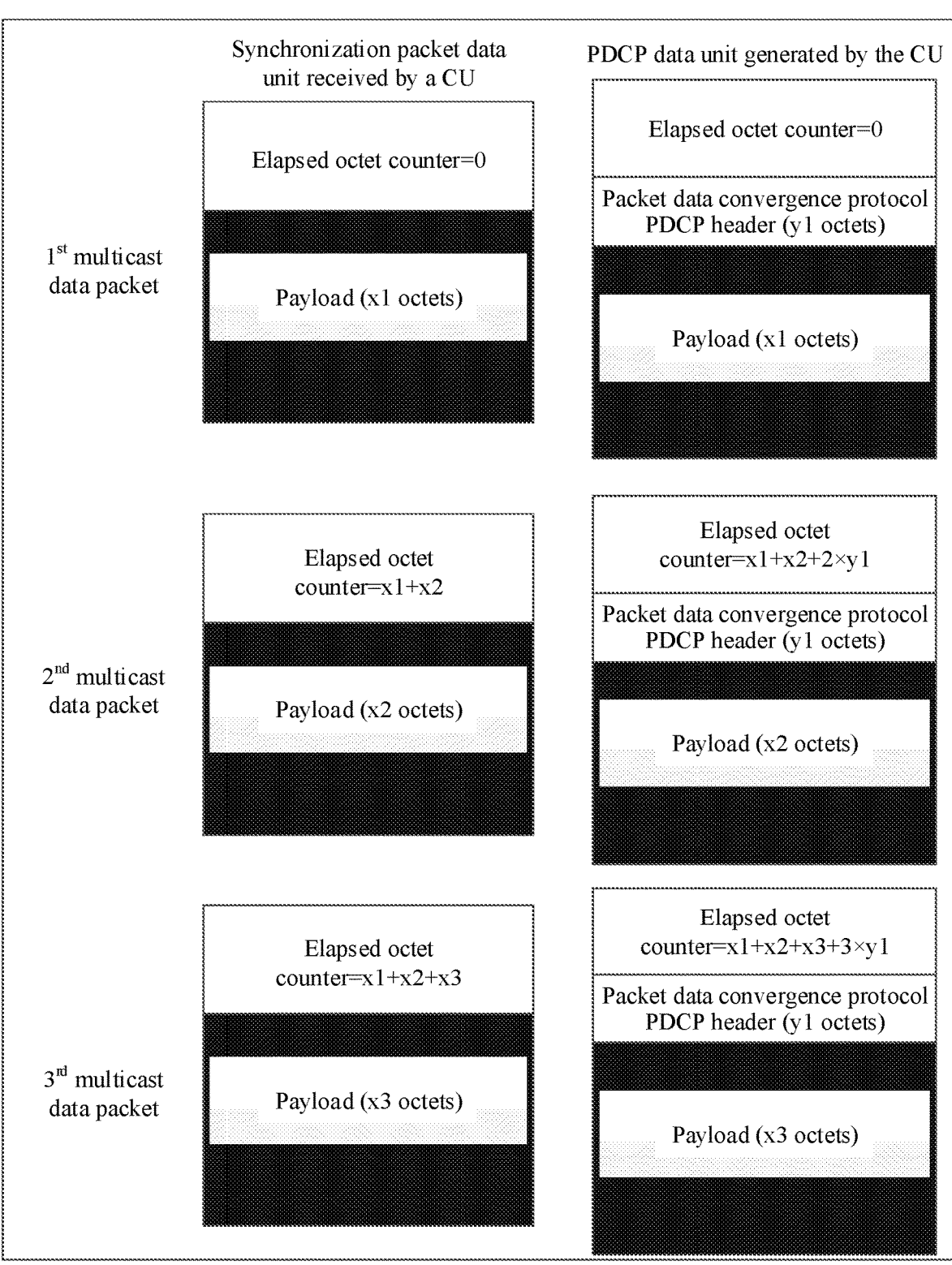
FIG. 12 is a third schematic diagram of generating a PDCP data unit by a centralized unit according to an embodiment of this application.

As shown in FIG. 12, the CU receives the $1^{st}$ multicast data packet, where a value of an octet counter in the $1^{st}$ multicast data packet is 0, and a payload has x1 octets. The CU generates a first PDCP data unit based on the $1^{st}$ multicast data packet, where a value of an octet counter in the first PDCP data unit is 0, a PDCP header has y1 octets, and the payload has the x1 octets. The CU sends the first PDCP data unit to the DU. The CU receives the $2^{nd}$ multicast data packet, where a value of an octet counter in the $2^{nd}$ multicast data packet is a sum of octets of payloads received by the CU in a first synchronization sequence, namely, x1+x2, and a payload has x2 octets. The CU generates a second PDCP data unit based on the $2^{nd}$ multicast data packet, where a value of an octet counter in the second PDCP data unit is a sum of the octets of the payloads received by the CU and octets of PDCP headers added by the CU in the first synchronization sequence, namely, x1+x2+2×y1, a PDCP header has y1 octets, and the payload has the x2 octets. The CU sends the second PDCP data unit to the DU. The CU receives the $3^{rd}$ multicast data packet, where a value of an octet counter in the $3^{rd}$ multicast data packet is x1+x2+x3, and a payload has x3 octets. The CU generates a third PDCP data unit based on the $3^{rd}$ multicast data packet, where a value of an octet counter in the third PDCP data unit is x1+x2+x3+3×y1, a PDCP header has y1 octets, and the payload has the x3 octets. The CU sends the PDCP data unit to the DU.

The DU receives the first PDCP data unit, the second PDCP data unit, and the third PDCP data unit in the first synchronization sequence. When receiving the second PDCP data unit, the DU learns that the value of the octet counter in the second PDCP data unit is x1+x2+2×y1. When the DU learns that a sum of octets of payloads and octets of PDCP headers of the elapsed first PDCP data unit in the first synchronization sequence is x1+x2+2×y1, the DU determines that no multicast data is lost when the second PDCP data unit is received. When receiving the third PDCP data unit, the DU learns that the value of the octet counter in the third PDCP data unit is x1+x2+x3+3×y1. The DU calculates a sum of octets of payloads and PDCP headers of the first PDCP data unit, the second PDCP data unit, and the third PDCP data unit received in the first synchronization sequence. When the DU determines that the sum of the octets of the payloads and the PDCP headers of the first PDCP data unit and the second PDCP data unit is equal to x1+x2+x3+3×y1, the DU determines that no multicast data is lost when the third PDCP data unit is received.

In an embodiment, the value of the octet counter included in the synchronization protocol header of the synchronization packet data unit received by the CU is a first value. After generating a PDCP data unit, the CU modifies the value of the octet counter to a second value. The second value is a sum of the first value and octets of the synchronization protocol header.

The DU receives a current PDCP data unit from the CU in a first synchronization sequence, and the DU obtains an octet counter included in a synchronization protocol header of the current PDCP data unit. If a value of the octet counter is the second value, the DU determines a sum of octets of a payload and octets of a synchronization protocol header of an elapsed PDCP data unit in the first synchronization sequence. If the sum of the octets of the payload and the octets of the synchronization protocol header of the PDCP data unit is the same as the second value, the DU determines that no data is lost when the current PDCP data unit is received. If the sum of the octets of the payload and the octets of the synchronization protocol header of the PDCP data unit is different from the second value, the DU determines that data is lost when the current PDCP data unit is received.

It should be noted that the first synchronization sequence herein may be one synchronization sequence, two synchronization sequences, or three synchronization sequences. This is not specifically limited in this application. The following describes the foregoing method in detail.

For example, the CU receives three synchronization packet data units in a first synchronization sequence, and the three synchronization packet data units are respectively a synchronization packet data unit a, a synchronization packet data unit b, and a synchronization packet data unit c in a receiving sequence. After generating a PDCP data unit a1 based on the synchronization packet data unit a, the CU modifies a value of an octet counter included in a synchronization protocol header to the second value. Similarly, after generating a PDCP data unit b1 based on the synchronization packet data unit b, the CU modifies a value of an octet counter included in a synchronization protocol header to the second value. After generating a PDCP data unit c1 based on the synchronization packet data unit c, the CU modifies a value of an octet counter included in a synchronization protocol header to the second value. The CU sends the PDCP data units a1, b1, and c1 to the DU.

The DU receives three PDCP data units in the first synchronization sequence, and the three PDCP data units are respectively the PDCP data unit a1, the PDCP data unit b1, and the PDCP data unit c1 in a receiving sequence. When receiving the PDCP data unit b1, the DU learns that the value of the octet counter included in the synchronization protocol header of the PDCP data unit is 100 bytes, and the DU calculates, in the first synchronization sequence, a sum of octets of a payload and a synchronization protocol header of an elapsed PDCP data unit, namely, the PDCP data unit a1. If the calculated sum of the octets is 100 bytes, the DU determines that no data is lost when the PDCP data unit b1 is received. When receiving the PDCP data unit c1, the DU learns that the value of the octet counter included in the synchronization protocol header of the PDCP data unit c1 is 200 bytes. The DU calculates a sum of octets of payloads of the PDCP data unit a1 and the PDCP data unit b1 and a sum of octets of synchronization protocol headers of the PDCP data unit a1 and the PDCP data unit b1. If the calculated sum of the octets is 200 bytes, the DU determines that no data is lost when the PDCP data unit c1 is received. If the calculated sum of the octets is not 200 bytes, the DU determines that data is lost when the PDCP data unit c1 is received.

In another embodiment, the value of the octet counter included in the synchronization protocol header of the synchronization packet data unit received by the CU is a first value. After generating a PDCP data unit, the CU modifies the value of the octet counter to a second value. The second value is a sum of the first value and octets of the synchronization protocol header.

The DU receives a current PDCP data unit from the CU in a first synchronization sequence, and the DU obtains an octet counter included in a synchronization protocol header of the current PDCP data unit. If a value of the octet counter is the second value, the DU determines a sum of octets of payloads and octets of synchronization protocol headers of all PDCP data units received in the first synchronization sequence. If the sum of the octets of the payloads and the octets of the synchronization protocol headers of the PDCP data units is the same as the second value, the DU determines that no data is lost when the current PDCP data unit is received. If the sum of the octets of the payloads and the octets of the synchronization protocol headers of the PDCP data units is different from the second value, the DU determines that data is lost when the current PDCP data unit is received.

It should be noted that the first synchronization sequence herein may be one synchronization sequence, two synchronization sequences, or three synchronization sequences. This is not specifically limited in this application. The following describes the foregoing method in detail.

For example, the CU receives three synchronization packet data units in a first synchronization sequence, and the three synchronization packet data units are respectively a synchronization packet data unit a, a synchronization packet data unit b, and a synchronization packet data unit c in a receiving sequence. After generating a PDCP data unit a1 based on the synchronization packet data unit a, the CU modifies a value of an octet counter included in a synchronization protocol header to the second value. Similarly, after generating a PDCP data unit b1 based on the synchronization packet data unit b, the CU modifies a value of an octet counter included in a synchronization protocol header to the second value. After generating a PDCP data unit c1 based on the synchronization packet data unit c, the CU modifies a value of an octet counter included in a synchronization protocol header to the second value. The CU sends the PDCP data units a1, b1, and c1 to the DU.

The DU receives three PDCP data units in the first synchronization sequence, and the three PDCP data units are respectively the PDCP data unit a1, the PDCP data unit b1, and the PDCP data unit c1 in a receiving sequence. When receiving the PDCP data unit b1, the DU learns that the value of the octet counter included in the synchronization protocol header of the PDCP data unit is 200 bytes, and the DU calculates a sum of octets of payloads and synchronization protocol headers of all PDCP data units, namely, the PDCP data unit a1 and the PDCP data unit b1, that are received in the first synchronization sequence. If the calculated sum of the octets is 200 bytes, the DU determines that no data is lost when the PDCP data unit b1 is received. When receiving the PDCP data unit c1, the DU learns that the value of the octet counter included in the synchronization protocol header of the PDCP data unit c1 is 350 bytes. The DU calculates a sum of octets of payloads of the PDCP data unit a1, the PDCP data unit b1, and the PDCP data unit c1, and a sum of octets of synchronization protocol headers of the PDCP data unit a1, the PDCP data unit b1, and the PDCP data unit c1. If the calculated sum of the octets is 350 bytes, the DU determines that no data is lost when the PDCP data unit c1 is received. If the calculated sum of the octets is not 350 bytes, the DU determines that data is lost when the PDCP data unit c1 is received.

The foregoing describes in detail the communication method in embodiments of this application with reference to FIG. 3 to FIG. 12. The following describes in detail communication apparatuses in embodiments of this application with reference to FIG. 13 to FIG. 15.

Figure 13:
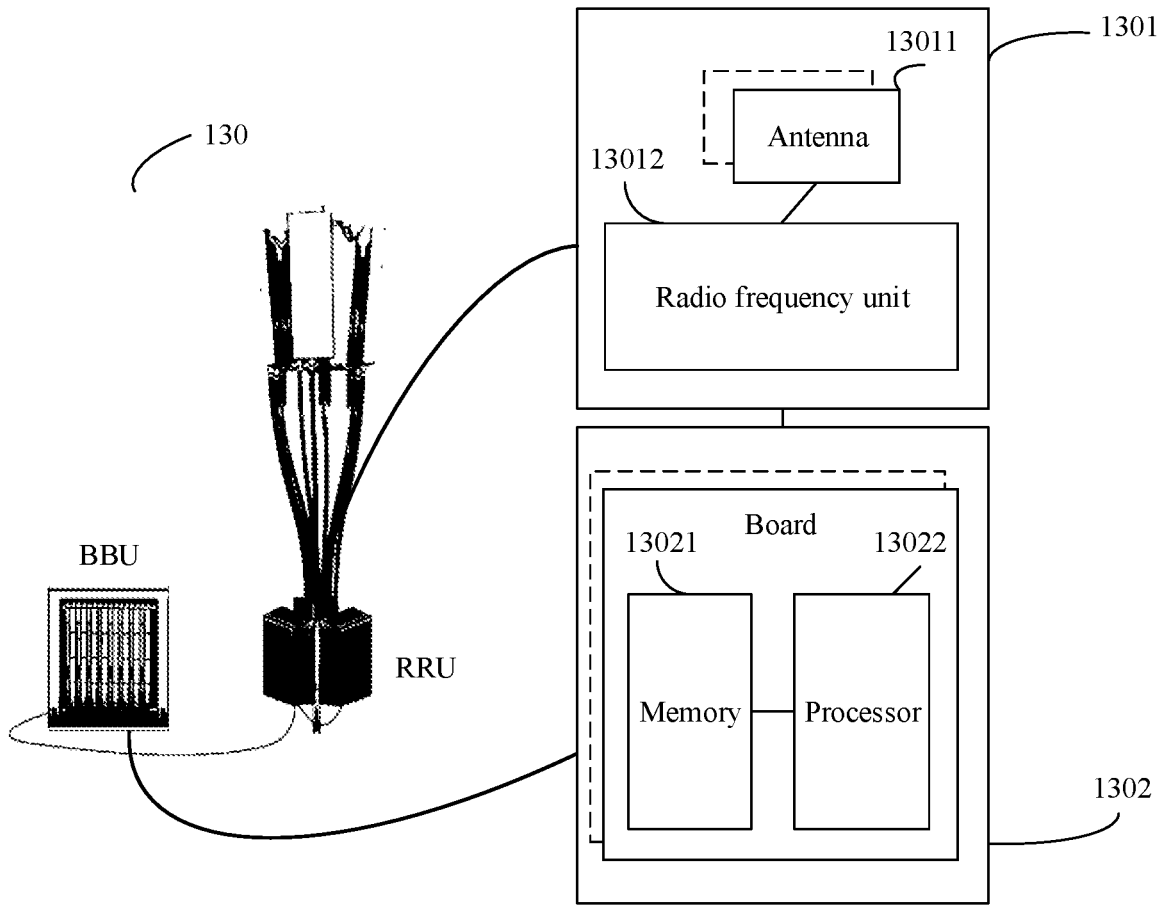
FIG. 13 is a first schematic diagram of a structure of a network device according to an embodiment of this application.

FIG. 13 is a schematic diagram of a structure of a network device according to an embodiment of this application, for example, may be a schematic diagram of a structure of a base station. As shown in FIG. 13, the base station may be used in the system shown in FIG. 1, to perform functions of the centralized unit in the foregoing method embodiments. The base station 130 may include one or more radio frequency units, such as a remote radio unit (RRU) 1301 and one or more baseband units (BBUs) (which may also be referred to as digital units or DUs) 1302. The RRU 1301 may be referred to as a transceiver unit, a transceiver, a transceiver circuit, a transceiver, or the like, and may include at least one antenna 13011 and a radio frequency unit 13012. The RRU 1301 part is mainly configured to perform sending and receiving of a radio frequency signal and conversion between the radio frequency signal and a baseband signal, for example, configured to send the PDCP data unit in the foregoing embodiments to a distributed unit. The BBU 1302 part is mainly configured to: perform baseband processing, control a base station, and so on. The RRU 1301 and the BBU 1302 may be physically disposed together; or may be physically disposed separately, in other words, in a distributed base station.

The BBU 1302 is a control center of the base station, may also be referred to as a processing unit, and is mainly configured to implement baseband processing functions such as channel coding, multiplexing, modulation, and spectrum spreading. For example, the BBU (e.g., processing unit) 1302 may be configured to control the base station to perform an operation procedure related to the centralized unit in the foregoing method embodiments.

In an example, the BBU 1302 may include one or more boards. A plurality of boards may jointly support a radio access network (such as an LTE network) of a single access standard, or may separately support radio access networks (such as an LTE network, a 5G network, and another network) of different access standards. The BBU 1302 further includes a memory 13021 and a processor 13022. The memory 13021 is configured to store instructions and data. For example, the memory 13021 stores the synchronization protocol header in the foregoing embodiments. The processor 13022 is configured to control the base station to perform an associated action, for example, configured to control the base station to perform an operation procedure related to the centralized unit in the foregoing method embodiments. The memory 13021 and the processor 13022 may serve one or more boards. In other words, a memory and a processor may be independently disposed on each board, or a plurality of boards may share a same memory and a same processor. In addition, a relevant circuit may further be disposed on each board.

Figure 14:
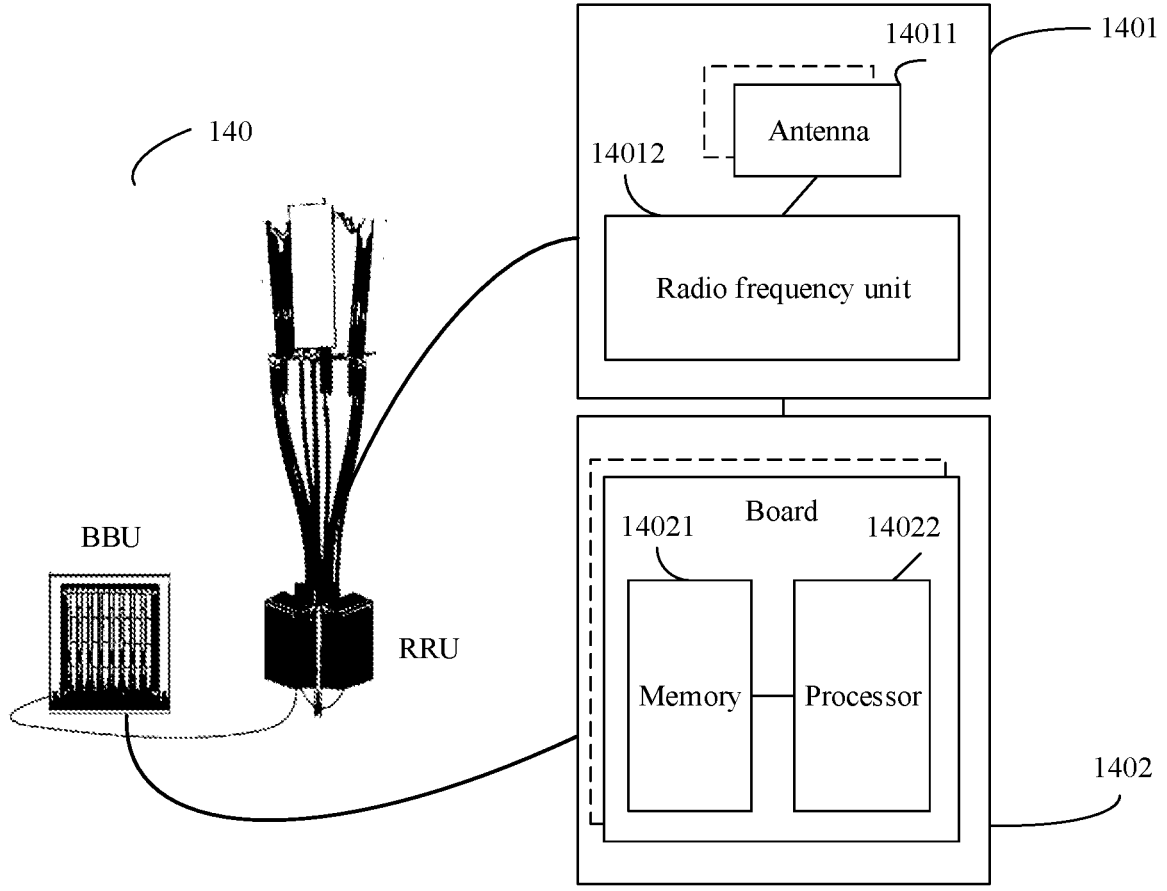
FIG. 14 is a second schematic diagram of a structure of a network device according to an embodiment of this application.

FIG. 14 is a schematic diagram of a structure of a network device according to an embodiment of this application, for example, may be a schematic diagram of a structure of a base station. As shown in FIG. 14, the base station may be used in the system shown in FIG. 1, to perform functions of the distributed unit in the foregoing method embodiments. The base station 140 may include one or more radio frequency units, such as a remote radio unit (RRU) 1401 and one or more baseband units (BBUs) (which may also be referred to as digital units or DUs) 1402. The RRU 1401 may be referred to as a transceiver unit, a transceiver, a transceiver circuit, a transceiver, or the like, and may include at least one antenna 14011 and a radio frequency unit 14012. The RRU 1401 part is mainly configured to perform sending and receiving of a radio frequency signal and conversion between the radio frequency signal and a baseband signal, for example, configured to send the MAC data unit in the foregoing embodiments to a terminal. The BBU 1402 part is mainly configured to: perform baseband processing, control a base station, and so on. The RRU 1401 and the BBU 1402 may be physically disposed together; or may be physically disposed separately, in other words, in a distributed base station.

The BBU 1402 is a control center of the base station, may also be referred to as a processing unit, and is mainly configured to implement baseband processing functions such as channel coding, multiplexing, modulation, and spectrum spreading. For example, the BBU (processing unit) 1402 may be configured to control the base station to perform an operation procedure related to the distributed unit in the foregoing method embodiments.

In an example, the BBU 1402 may include one or more boards. A plurality of boards may jointly support a radio access network (such as an LTE network) of a single access standard, or may separately support radio access networks (such as an LTE network, a 5G network, and another network) of different access standards. The BBU 1402 further includes a memory 14021 and a processor 14022. The memory 14021 is configured to store instructions and data. The processor 14022 is configured to control the base station to perform an associated action, for example, configured to control the base station to perform an operation procedure related to the centralized unit in the foregoing method embodiments. The memory 14021 and the processor 14022 may serve one or more boards. In other words, a memory and a processor may be independently disposed on each board, or a plurality of boards may share a same memory and a same processor. In addition, a relevant circuit may further be disposed on each board.

Figure 15:
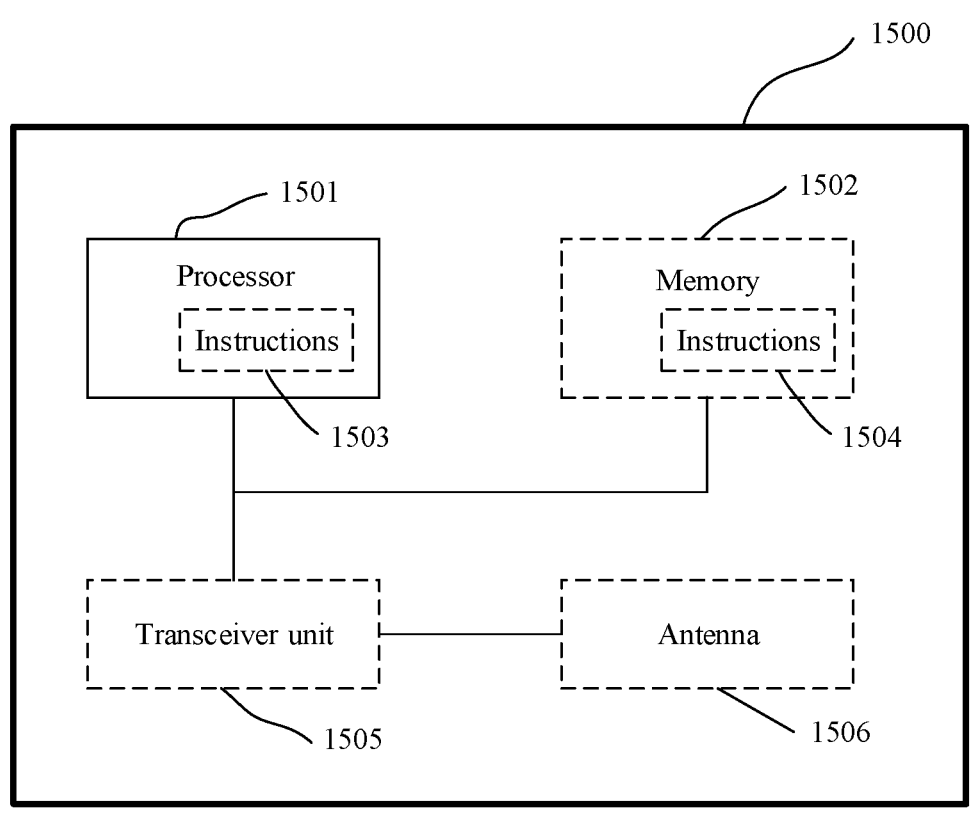
FIG. 15 is a schematic diagram of a structure of a communication apparatus according to an embodiment of this application.

FIG. 15 is a schematic diagram of a structure of a communication apparatus 1500. The apparatus 1500 may be configured to implement the method described in the foregoing method embodiments. For details, refer to the descriptions in the foregoing method embodiments. The communication apparatus 1500 may be a chip, a network device (such as a base station), a terminal device, another network device, or the like.

The communication apparatus 1500 includes one or more processors 1501. The processor 1501 may be a general-purpose processor, a dedicated processor, or the like. For example, the processor may be a baseband processor or a central processing unit. The baseband processor may be configured to process a communication protocol and communication data. The central processing unit may be configured to: control the communication apparatus (for example, a base station, a terminal, or a chip), execute a software program, and process data of the software program. The communication apparatus may include a transceiver unit that is configured to input (receive) and output (send) a signal. For example, the communication apparatus may be a chip, and the transceiver unit may be an input and/or output circuit or a communication interface of the chip. The chip may be used for a terminal, a base station, or another network device. For another example, the communication apparatus may be a terminal, a base station, or another network device, and the transceiver unit may be a transceiver, a radio frequency chip, or the like.

The communication apparatus 1500 includes one or more processors 1501, and the one or more processors 1501 may implement the method performed by the centralized unit or the distributed unit in the embodiment shown in FIG. 3.

In an embodiment, the communication apparatus 1500 includes a means (means) configured to generate a PDCP data unit or a MAC data unit, and a means (means) configured to send the PDCP data unit or the MAC data unit. Functions of the means for generating the PDCP data unit or the MAC data unit and the means for sending the PDCP data unit or the MAC data unit may be implemented by using one or more processors. For example, the PDCP data unit or the MAC data unit may be generated by using the one or more processors, and the PDCP data unit or the MAC data unit may be sent by using the transceiver, the input/output circuit, or the interface of the chip. For the PDCP data unit or the MAC data unit, refer to related descriptions in the foregoing method embodiments.

In an embodiment, the communication apparatus 1500 includes a means (means) configured to receive a data packet, a PDCP data unit, or a MAC data unit, and a means (means) configured to send the PDCP data unit based on the data packet or a means (means) configured to send the MAC data unit based on the PDCP data unit. For the data packet and how to send the PDCP data unit based on the data packet, refer to related descriptions in the foregoing method embodiments. For example, the data packet may be received by using the transceiver, the input/output circuit, or the interface of the chip, and the PDCP data unit may be sent based on the data packet by using one or more processors. For the PDCP data unit and how to send the MAC data unit based on the PDCP data unit, refer to related descriptions in the foregoing method embodiments. For example, the PDCP data unit may be received by using the transceiver, the input/output circuit, or the interface of the chip, and the MAC data unit may be sent based on the PDCP data unit by using one or more processors.

In an embodiment, in addition to the method in the embodiment shown in FIG. 3, the processor 1501 may further implement another function.

In an embodiment, in a design, the processor 1501 may execute instructions, to enable the communication apparatus 1500 to perform the method described in the foregoing method embodiments. All or a part of the instructions, for example, instructions 1503, may be stored in the processor. Alternatively, all or a part of the instructions, for example, instructions 1504, may be stored in the memory 1502 coupled to the processor. Alternatively, both instructions 1503 and 1504 may be used to enable the communication apparatus 1500 to perform the method described in the foregoing method embodiments.

In still another embodiment, the communication apparatus 1500 may include a circuit, and the circuit may implement functions of the centralized unit or the distributed unit in the foregoing method embodiments.

In yet another embodiment, the communication apparatus 1500 may include one or more memories 1502 that store instructions 1504. The instructions may be run on the processor, to enable the communication apparatus 1500 to perform the method described in the foregoing method embodiments. In an embodiment, the memory may further store data. In an embodiment, the processor may also store instructions and/or data. For example, the one or more memories 1502 may store the synchronization protocol header described in the foregoing embodiments, the PDCP indication information in the foregoing embodiments, or the like. The processor and the memory may be separately disposed, or may be integrated together.

In still yet another embodiment, the communication apparatus 1500 may further include a transceiver unit 1505 and an antenna 1506. The processor 1501 may be referred to as a processing unit, and controls the communication apparatus (a terminal or a base station). The transceiver unit 1505 may be referred to as a transceiver, a transceiver circuit, a transceiver, or the like, and is configured to implement a transceiver function of the communication apparatus through the antenna 1506.

This application further provides a communication system, including the foregoing one or more network devices and one or more terminal devices.

It should be noted that the processor in embodiments of this application may be an integrated circuit chip, and has a signal processing capability. In a process, operations in the foregoing method embodiments may be implemented by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, operations, and logical block diagrams that are disclosed in embodiments of this application. The general-purpose processor may be a microprocessor, or the processor may be any conventional processor or the like. The operations of the methods disclosed with reference to embodiments of this application may be directly performed and completed by a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that, in embodiments of this application, the memory may be a volatile memory or a nonvolatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (Synchlink DRAM, SLDRAM), and a direct rambus random access memory (DR RAM). It should be noted that the memory in the system and the method described in this specification is intended to include, but not limited to, these memories and any memory of another proper type.

An embodiment of this application further provides a computer-readable medium. The computer-readable medium stores a computer program. When the computer program is executed by a computer, the communication method according to any one of the foregoing method embodiments is implemented.

An embodiment of this application further provides a computer program product. When the computer program product is executed by a computer, the communication method according to any one of the foregoing method embodiments is implemented.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

An embodiment of this application further provides a processing apparatus, including a processor and an interface. The processor is configured to perform the communication method according to any one of the foregoing method embodiments.

It should be understood that the processing apparatus may be a chip. The processor may be implemented by hardware, or may be implemented by software. When the processor is implemented by hardware, the processor may be a logic circuit, an integrated circuit, or the like. When the processor is implemented by software, the processor may be a general-purpose processor, implemented by reading software code stored in a memory. The memory may be integrated into the processor, or may be located outside the processor and exist independently.

It should be understood that "one embodiment" or "an embodiment" mentioned in the entire specification means that particular features, structures, or characteristics related to embodiments are included in at least one embodiment of this application. Therefore, "in one embodiment" or "in an embodiment" appearing in the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the processes of embodiments of this application.

In addition, the terms "system" and "network" are usually used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in embodiments of this application, "B corresponding to A" indicates that B is associated with A, and B may be determined based on A. However, it should be further understood that determining B based on A does not mean that B is determined based only on A. B may also be alternatively determined based on A and/or other information.

A person of ordinary skill in the art may be aware that, units and algorithm operations in the examples described with reference to embodiments disclosed herein may be implemented by electronic hardware, computer software, or a combination thereof. To clearly describe the interchangeability between the hardware and the software, the foregoing has generally described compositions and operations of each example according to functions. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on an actual requirement to achieve the objectives of the solutions in embodiments in this application.

In addition, function units in embodiments of this application may be integrated into one processing unit, each of the units may exist alone physically, or two or more units may be integrated into one unit. The integrated unit may be implemented in a form of hardware, or may be implemented in a form of a software function unit.

With descriptions of the foregoing embodiments, a person skilled in the art may clearly understand that this application may be implemented by hardware, firmware, or a combination thereof. When embodiments of this application are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of instructions or a data structure and is accessible by a computer. In addition, any connection may be properly defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (Disk) and disc (disc) used by this application includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A communication method, wherein the method comprises:

receiving, by a centralized unit, a data packet sent in a multicast manner;

generating, by the centralized unit, a packet data convergence protocol (PDCP) data unit based on the data packet received by the centralized unit in the multicast manner, wherein generating the PDCP data unit comprises adding a PDCP header to the data packet, wherein the data packet includes a synchronization protocol header including a quantity of elapsed data packets in a synchronization sequence and an octet counter included in the data packet being a first value, and wherein a sum of the first value and a quantity of octets of the synchronization protocol header equals to a second value of an octet counter of the PDCP data unit or a third value of an octet counter set by the centralized unit for determining, based on the sum and a quantity of octets of payload in the PDCP data unit, whether data is lost; and sending, by the centralized unit, the PDCP data unit to a distributed unit, wherein the centralized unit and the distributed unit form a CU-DU architecture of a new radio (NR) system.

2. The method according to claim 1, wherein the method further comprises:

sending, by the centralized unit, PDCP format information of the PDCP data unit to the distributed unit, wherein the PDCP format information comprises at least one of:
a length of the PDCP header,
a PDCP serial number SN length, or
a PDCP format indication.

3. The method according to claim 2, wherein the data packet comprises the synchronization protocol header and a payload, and in the data packet, the payload is located after the synchronization protocol header; and in the PDCP data unit, the PDCP header is located before the synchronization protocol header.

4. The method according to claim 1, wherein the data packet comprises a synchronization protocol header and a payload, and in the data packet, the payload is located after the synchronization protocol header; and in the PDCP data unit, the payload is located after the PDCP header, and the synchronization protocol header is located after the payload.

5. The method according to claim 1, wherein the data packet comprises a synchronization protocol header and a payload, and in the data packet, the payload is located after the synchronization protocol header; and in the PDCP data unit, the PDCP header is located after the synchronization protocol header, and the payload is located after the PDCP header.

6. The method according to claim 1, wherein the data packet comprises a first synchronization packet data unit, the first synchronization packet data unit comprises a synchronization protocol header and a payload, and in the first synchronization packet data unit, the payload is located after the synchronization protocol header; in the PDCP data unit, the PDCP header is located before a second synchronization packet data unit; and the second synchronization packet data unit is obtained by reversing a bit stream of the first synchronization packet data unit.

7. The method according to claim 1, wherein the data packet comprises a payload and a synchronization protocol header, and in the data packet, the synchronization protocol header is located after the payload; and in the PDCP data unit, the PDCP header is located before the payload.

8. A communication apparatus of a centralized unit, comprising:

one or more processors; and a memory configure to store program instructions;

wherein, when executed by the one or more processors, the program instructions cause the communications apparatus to:

receive a data packet sent in a multicast manner;

generate a packet data convergence protocol (PDCP) data unit based on the data packet received by the centralized unit in the multicast manner by adding a PDCP header to the data packet, wherein the data packet includes a synchronization protocol header including a quantity of elapsed data packets in a synchronization sequence and an octet counter included in the data packet being a first value, and wherein a sum of the first value and a quantity of octets of the synchronization protocol header equals to a second value of an octet counter of the PDCP data unit or a third value of an octet counter set by the centralized unit for determining, based on the sum and a quantity of octets of payload in the PDCP data unit, whether data is lost; and send the PDCP data unit from the centralized unit to a distributed unit, wherein the centralized unit and the distributed unit form a CU-DU architecture of a new radio (NR) system.

9. The communication apparatus according to claim 8, wherein the program instructions further cause the communications apparatus to:

send PDCP format information of the PDCP data unit to the distributed unit, wherein the PDCP format information comprises at least one of:
a length of the PDCP header,
a PDCP serial number SN length, or
a PDCP format indication.

10. The communication apparatus according to claim 9, wherein the data packet comprises the synchronization protocol header and a payload, and in the data packet, the payload is located after the synchronization protocol header; and in the PDCP data unit, the PDCP header is located before the synchronization protocol header.

11. The communication apparatus according to claim 8, wherein the data packet comprises a synchronization protocol header and a payload, and in the data packet, the payload is located after the synchronization protocol header; and in the PDCP data unit, the payload is located after the PDCP header, and the synchronization protocol header is located after the payload.

12. The communication apparatus according to claim 8, wherein the data packet comprises a synchronization protocol header and a payload, and in the data packet, the payload is located after the synchronization protocol header; and in the PDCP data unit, the PDCP header is located after the synchronization protocol header, and the payload is located after the PDCP header.

13. The communication apparatus according to claim 8, wherein the data packet comprises a first synchronization packet data unit, the first synchronization packet data unit comprises a synchronization protocol header and a payload, and in the first synchronization packet data unit, the payload is located after the synchronization protocol header; in the PDCP data unit, the PDCP header is located before a second synchronization packet data unit; and the second synchronization packet data unit is obtained by reversing a bit stream of the first synchronization packet data unit.

14. The communication apparatus according to claim 8, wherein the data packet comprises a payload and a synchronization protocol header, and in the data packet, the synchronization protocol header is located after the payload; and in the PDCP data unit, the PDCP header is located before the payload.

* * * * *